US012766457B2

(12) United States Patent
Ho et al.

(10) Patent No.: US 12,766,457 B2
(45) Date of Patent: Oct. 20, 2026

(54) PORTABLE PRESSURE SWING ADSORPTION METHOD AND SYSTEM FOR LOW FLOW RATE GAS PROCESSING

(71) Applicant: Coldstream Energy IP, LLC, Dallas, TX (US)

(72) Inventors: Jason G. S. Ho, Houston, TX (US); Gerald Bowen Gump, Allen, TX (US); Pedro T. Santos, Houston, TX (US); Xuepei Yuan, Humble, TX (US)

(73) Assignee: Coldstream Energy IP, LLC, Houston, TX (US)

( * ) Notice: Subject to any disclaimer, the term of this patent is extended or adjusted under 35 U.S.C. 154(b) by 350 days.

(21) Appl. No.: 18/686,078

(22) PCT Filed: Sep. 8, 2022

(86) PCT No.: PCT/US2022/042942

§ 371 (c)(1),
(2) Date: Feb. 23, 2024

(87) PCT Pub. No.: WO2023/039093

PCT Pub. Date: Mar. 16, 2023

(65) Prior Publication Data

US 2024/0278167 A1 Aug. 22, 2024

Related U.S. Application Data

(60) Provisional application No. 63/242,396, filed on Sep. 9, 2021.

(51) Int. Cl.

*B01D 53/02* (2006.01)
*B01D 53/047* (2006.01)

(Continued)

(52) U.S. Cl.

CPC ....... *B01D 53/0476* (2013.01); *B01D 53/053* (2013.01); *C10L 3/101* (2013.01);

(Continued)

(58) Field of Classification Search

CPC ........ B01D 2253/102; B01D 2253/104; B01D 2253/106; B01D 2253/204;

(Continued)

(56) References Cited

U.S. PATENT DOCUMENTS 4,229,188 A * 10/1980 Intille .................... B01D 53/04 95/55
4,695,442 A 9/1987 Pinto et al.

(Continued)

FOREIGN PATENT DOCUMENTS

KR 10-0536766 B1 12/2005
WO WO2015/123257 A1 8/2015
WO 2017/039988 A1 3/2017

OTHER PUBLICATIONS

European Patent Office, Extended European Search Report for PCT/US2022/042929, mailed Jul. 31, 2025, 21 pages, Munich, Germany.

(Continued)

*Primary Examiner* — Christopher P Jones
(74) *Attorney, Agent, or Firm* — Frederic Dorwart Lawyers, PLLC; Penina Michlin

(57) ABSTRACT

A portable pressure swing adsorption method and system for low flow rate gas processing. A method of processing of hydrocarbon gas includes feeding hydrocarbon gas through a first adsorption bed of a pressure swing adsorption system, recovering light product from the first adsorption bed during the feed time, obtaining heavy product from a second adsorption bed during the feed time, wherein the second adsorption bed depressurizes to about vacuum during the (Continued)

TIME INCREMENT 1 feed time, compressing the heavy product to obtain natural gas liquid and vapor, sending a volume of reflux gas through the first adsorption bed after the feed time to obtain additional light product, and adjusting the feed flowrate, the feed time, or the volume of reflux gas based on a gross heating value of the feed gas, wherein adjusting the volume of reflux gas includes combining NGL storage tank vapor with the reflux gas.

9 Claims, 20 Drawing Sheets

(51) Int. Cl.
*B01D 53/053* (2006.01)
*C10L 3/10* (2006.01)

(52) U.S. Cl.
CPC .................. *B01D 2256/245* (2013.01); *B01D 2257/7022* (2013.01); *B01D 2259/40007* (2013.01); *B01D 2259/4003* (2013.01); *B01D 2259/40035* (2013.01); *B01D 2259/40069* (2013.01); *B01D 2259/404* (2013.01); *B01D 2259/4541* (2013.01); *C10L 2200/0415* (2013.01)

(58) Field of Classification Search
CPC ...... B01D 2256/245; B01D 2257/7022; B01D 2259/40007; B01D 2259/40013; B01D 2259/40026; B01D 2259/4003; B01D 2259/40033; B01D 2259/40035; B01D 2259/40049; B01D 2259/40054; B01D 2259/40069; B01D 2259/40075; B01D 2259/404; B01D 2259/4541; B01D 2259/455; B01D 53/047; B01D 53/0476; B01D 53/053; C10L 2200/0415; C10L 2290/06; C10L 2290/567; C10L 3/101; C10L 3/12; E21B 43/34
See application file for complete search history.

(56) References Cited

U.S. PATENT DOCUMENTS

| | | | | |
|---|---|---|---|---|
| 5,171,333 | A | 12/1992 | Maurer | |
| 7,520,916 | B2 | 4/2009 | McElroy et al. | |
| 7,947,118 | B2 | 5/2011 | Rarig et al. | |
| 8,394,174 | B2 | 3/2013 | Chen et al. | |
| 9,034,079 | B2 | 5/2015 | Deckman et al. | |
| 9,579,598 | B2 | 2/2017 | Ritter et al. | |
| 9,719,024 | B2 | 8/2017 | Young et al. | |
| 9,908,078 | B2 | 3/2018 | Ho et al. | |
| 9,944,872 | B2 | 4/2018 | Matteucci et al. | |
| 9,945,608 | B2 | 4/2018 | Ploeger et al. | |
| 10,293,298 | B2 | 5/2019 | Marshall et al. | |
| 10,441,915 | B2 | 10/2019 | Ho et al. | |
| 10,464,810 | B2 | 11/2019 | Pham Duc et al. | |
| 11,117,088 | B2 | 9/2021 | Boulet et al. | |
| 2002/0077519 | A1* | 6/2002 | Miller | C07C 15/08 585/827 |
| 2012/0222552 | A1 | 9/2012 | Ravikovitch et al. | |
| 2014/0148519 | A1* | 5/2014 | Drnevich | C01B 3/382 518/700 |
| 2015/0376092 | A1 | 12/2015 | Tsai et al. | |
| 2016/0340596 | A1 | 11/2016 | Matteucci et al. | |
| 2017/0136402 | A1 | 5/2017 | Sundaram et al. | |
| 2019/0134556 | A1 | 5/2019 | Ho et al. | |

OTHER PUBLICATIONS

European Patent Office, Supplementary European Search Report for PCT/US2022/042942, mailed Aug. 5, 2025, 21 pages, Munich, Germany.

Korean Intellectual Property Office, Written Opinion of the International Preliminary Examining Authority for PCT/US2022/042942, Jan. 3, 2023, 6 pages.

Korean Intellectual Property Office, International Preliminary Report on Patentability for PCT/ US2022/042942, Dec. 26, 2023, 3 pages.

Korean Intellectual Property Office, International Search Report for PCT US2022/042942, Jan. 3, 2023, 3 pages.

* cited by examiner

| TIME INCREMENT (260) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BED A (200) | FEED | | | | HR | | Ed | CoD | CnD 1 | CnD 2 | CnD 3 | | LR | | Eu | LPP |
| BED B | HR | | Ed | CoD | CnD 1 | CnD 2 | CnD 3 | | LR | | Eu | LPP | FEED | | | |
| BED C | CnD 1 | CnD 2 | CnD 3 | | LR | | Eu | LPP | FEED | | | | HR | | Ed | CoD |
| BED D (240) | LR | | Eu | LPP | FEED | | | | HR | | Ed | CoD | CnD 1 | CnD 2 | CnD 3 | |
| TIME, S (250) | 100 | x | 40 | y | 100 | x | 40 | y | 100 | x | 40 | y | 100 | x | 40 | y |

TIME INCREMENT 1

TIME INCREMENT 2

TIME INCREMENT 4

TIME INCREMENT 5

TIME INCREMENT 6

TIME INCREMENT 7

TIME INCREMENT 8

TIME INCREMENT 10

TIME INCREMENT 11

TIME INCREMENT 12

TIME INCREMENT 13

TIME INCREMENT 16

PORTABLE PRESSURE SWING ADSORPTION METHOD AND SYSTEM FOR LOW FLOW RATE GAS PROCESSING

BACKGROUND

1. Field of the Invention

Embodiments of the invention described herein pertain to the field of recovering associated hydrocarbon gas from oil wells and gas wells rich in liquids. More particularly, but not by way of limitation, one or more embodiments of the invention enable a portable pressure swing adsorption method and system for low flow rate gas processing.

2. Description of the Related Art

Energy is a basic need in modern societies. It plays a crucial role in ensuring cooking, heating, cooling, transportation, communication, and basic electricity, which all contribute to human health and well-being. Most households, regardless of geographic location and socio-economic level, need access to low-cost, reliable energy—making energy efficiency and energy literacy of high importance. While the energy market is linked to global markets and trends, individuals and societies feel cost and reliability impacts locally. For this reason, the local use and development of energy resources should be done safely, efficiently, and in an environmentally sensitive manner, while maximizing the value of the energy resource produced. One such energy resource is natural gas.

Raw natural gas, often found with oil (associated gas), contains concentrations of natural gas liquids (NGLs) that need to be removed by gas processing in order to meet specifications required by a natural gas pipeline and for end use by consumers. In raw natural gas, NGLs naturally occur in gaseous form and are typically homogeneously distributed/diffused in the gas mixture. Although naturally gaseous, NGLs are generally referred to as "liquids" since NGLs may liquefy in relatively warm temperatures and relatively low pressures. NGL components such as ethane, propane, butane and natural gasoline (pentanes plus) can be used for energy, and have higher sales values than pipeline quality natural gas, which is largely comprised of methane. Ethane, propane and butane are valuable chemical feedstocks, and propane and butane can be blended to form liquefied petroleum gas (LPG) which is a valuable residential fuel. Therefore, NGLs are oftentimes extracted and fractionated in gas processing plants in accordance with the specific requirements of the regional pipelines and customers. Generally, commercial NGL specifications require less than about 0.5% by liquid volume of methane and less than 500 ppm of $CO_2$ by volume in liquid.

As a commercial fuel source, pipelines, local distribution companies (LDCs) and consumers need to know the expected range and quality of the fuel being delivered, and ideally need to have some control over the variability of that fuel to assure compliance with regulations, to protect equipment, and most importantly, to ensure safety for all involved in natural gas processing, transport, and use. Therefore, gas specifications help limit the range of variability inherent in natural gas transported around the world. Typically, for natural gas pipelines, pipeline specifications indicate that the specific energy content of the natural gas should not exceed about 1,100 British thermal unit per standard cubic foot (Btu/scf) of natural gas.

Variables that affect choice of the most cost-effective process for minimizing non-methane hydrocarbons in the natural gas include: inlet conditions such as for example gas volumes at the wellhead or aggregated through a pipeline system, gas pressure, richness (presence of heavier hydrocarbons, such as, propane, butane, pentanes) of the gas; downstream conditions such as sales or transfer points where gas specifications require the removal of NGLs, for example residue gas pressure, hydrocarbon liquid products desired, and availability of NGL pipelines and liquid fractionation infrastructure; and overall conditions such as for example utility costs and fuel value, location, existing location infrastructure and market stability. Because of this variability, there are a number of technologies to recover NGLs and remove other contaminants from natural gas streams. Market demand and perceived return on investment drive these technology choices.

Due to the flow rate of the gas and the location of the gas, especially in relation to pipeline infrastructure that can provide downstream processing, it is often uneconomical to recover and separate natural gas and NGLs at the source of energy production, the wellsite. Furthermore, without existing infrastructure, transportation costs from remote wellsite locations to market can be significant. Most treatment methods require complicated equipment with high capital costs. Therefore, processing at the source is typically only economical for wells with high gas flow rates.

Generically, the energy industry lacks capital efficient technologies to separate and recover NGLs from gas, especially at the wellsite. The construction cost of long-distance pipeline hinders the recoveries of NGLs from associated gas and rich natural gas when wellsites are located in remote areas. Low flow rate gas wells that require processing prior to delivery into the existing pipelines also remain stranded. Further, despite the potential methods to manage associated gas, only a few methods are actually used in practice. For example, the gas can be sold in natural gas and rich natural gas distribution networks after low-temperature refrigeration or cryogenic condensing processes, used for on-site electricity generation via engines or turbines, re-injected for enhanced oil recovery, or converted into liquid energy feedstock via advanced chemical reactions. Additionally, the beneficial use of this associated gas or rich gas at wellsites or even along the gas gathering system produces challenges. Using gas rich in NGLs as fuel, presents operational and maintenance challenges for both compressors and generators. Combustion or consumption of the unprocessed gas is less efficient and produces higher emissions and causes greater wear and tear on the equipment.

As stated above, oil and gas producers have some options to address stranded gas, but all options require the removal of NGLs in this gas for these options to be of optimal utility. On-site electricity generation requires an expensive interconnection to the electrical utility network, and even then, the generator usually has relatively low energy conversion efficiency and high capital and operating expenses, especially when using raw, unprocessed gas.

Gas to liquid (GTL) conversion, monetization and related refinery processes require specific and potentially expensive catalysts to convert gas into ambient temperature liquids, oxides or olefins. Due to high upfront capital investment as a result of the high level of technical complexity and high energy intensity required, these methods have not-yet been successfully commercialized at rates less than 50 Million standard cubic feet per day (MMscfd). And for a GTL conversion process to be successful requires either the GTL system to be more feedstock flexible or the removal of non-methane products prior to the inlet of the system. Alternatively, cryogenic turboexpansion systems, commonly used by gas processing companies, are only economically applied to systems of at least 50 to 100 MMscfd. This is also a capital-intensive, complicated process with the necessary use of specialized metals and materials in construction to handle the extreme temperatures. Cryogenic turboexpansion is also an energy-intensive process. Another alternative is Joule-Thomson unit (JT unit) designs, which require wells to produce gas at high pressure or expensive upfront compression systems to provide the pressure drop necessary for any significant cooling to occur. A JT unit can require anywhere from 250 psi to 800 psi differential pressure to operate, while only achieving a low percentage recovery of NGLs, and often times require methanol injection or other freeze protection additives into the stream, thereby introducing further contaminants and costs into the separated energy products.

Mechanical refrigeration is another conventional process used for NGL recovery. However, similar to Joule-Thomson and cryogenic turboexpanders, the focus is on gas processing through cooling and condensation of the hydrocarbons. Much work (energy) is required to compress the raw gas to pressures above 500 psig, and a separate refrigeration loop is also required to provide the chilled fluid necessary to liquify the NGLs. The greater the compression requirement, the greater the cooling effect and therefore the greater the recovery, though recoveries of propane and, especially, ethane remain poor. As with all technologies that operate at temperatures below freezing, special materials are required for construction and there is always risk of freezing non-hydrocarbon contaminants within the system. Similar to the larger, more complex cryogenic process, mechanical refrigeration systems are also not particularly suited to turndown operations and do not operate efficiently to process gas compositions that deviate from the initial design basis of the equipment. Therefore, there is still a dearth of methods capable of targeting stranded gas assets at flow rates lower than 5 MMscfd and at pressures lower than 500 psig. Furthermore, infrastructure-constrained production with minimal site-prep or complex logistics and commissioning and long lead times for deployment are still challenges.

Attempts have been made to utilize pressure swing adsorption separation of a pressurized feed gas stream to produce two product streams: a methane product stream and a second product stream comprised of components with a higher molecular weight than methane. However, these conventional methods suffer from the drawback that they are only able to handle input feed gas with a limited range of compositions and heating values. For example, the lower limit of methane in the feed gas composition is typically 80.0 mol %, and the gross heating value must be lower than 1,200 British thermal units (Btu). This significantly limits the commercial viability of conventional pressure swing adsorption separation methods because many wells produce gas and/or associated gas that does not meet either gas composition limitations or the heating value criteria, and any pretreatment or blending of the input gas prohibitively increases the cost and footprint.

As a result of these difficulties, a significant portion of natural gas is typically flared at wellsites, which is not efficient nor is it an environmentally or socially responsible use of this energy resource. Flaring of raw natural gas at wellsites does not contribute to human well-being and does not maximize the value of the energy produced. In addition to wasting this energy resource, flaring also produces a significant amount of greenhouse gas and volatile organic compound emissions.

As is apparent from the above, there is a need for a natural gas separation technique that is portable, has low capital cost, can accept a wider range of gas compositions and is economical for low gas flow rates in order to reduce flaring and allow high quality natural gas and NGL output. There is a need for a capital efficient, low operating pressure technology for removing NGLs from rich gas. An improved portable pressure swing adsorption method and system for low flow rate gas processing can address this deficiency in the gas processing space (energy space).

As is apparent from the above, there is a need for a portable pressure swing adsorption method and system for low flow rate gas processing.

SUMMARY

One or more embodiments of the invention enable an improved pressure swing adsorption method and portable system for low flow rate gas processing.

An improved portable pressure swing adsorption method and system for low flow rate gas processing is described. An illustrative embodiment of an improved method of processing hydrocarbon gas produced from a well, includes pressurizing a feed stream including a mixture of hydrocarbon gases, heating the pressurized feed stream to at least 100° C., flowing the heated and pressurized feed stream through an adsorbent bed, wherein the adsorbent bed adsorbs at least a portion of ethane-plus (C2+) hydrocarbons from the hydrocarbon gases and ejects a light product including at least 50 mol % methane, adiabatically lowering of the pressure of the adsorbent bed to desorb at least a portion of C2+ hydrocarbons to form a heavy product, compressing the heavy product to produce natural gas liquid (NGL) and NGL storage tank vapor, and sending the tank vapor in a cocurrent flow passing through the adsorbent bed in order to rinse the bed of residual methane, and combining the residual methane with the light product. In some embodiments, the light product is pipeline quality natural gas. In certain embodiments, the feed stream is pressurized to between 50-215 psia. In some embodiments, the adiabatically lowering the pressure of the adsorbent bed includes equalization down, cocurrent depressurization and countercurrent depressurization. In certain embodiments, the countercurrent depressurization includes a plurality of countercurrent depressurization stages, and wherein a final stage of the plurality of countercurrent depressurization stages includes applying a reflux pump to the countercurrent depressurization. In some embodiments, a portion of the light product circulates to a second adsorbent bed, the second adsorbent bed repressurizing after the second adsorbent bed has regenerated. In certain embodiments, the well is one of an oil well, a gas well or a combination thereof.

An illustrative embodiment of a method of processing hydrocarbon gas includes feeding heated and pressurized hydrocarbon gas at a feed flowrate for a feed time through a first adsorption bed of a pressure swing adsorption (PSA) system, recovering a light product from the first adsorption bed during the feed time, obtaining a heavy product from a second adsorption bed of the PSA system during the feed time, compressing the heavy product to obtain natural gas liquid (NGL) and NGL storage tank vapor from the heavy product, sending a volume of reflux gas through the first adsorption bed after the feed time to obtain additional light product, and adjusting one of the feed flowrate, the feed time, the volume of reflux gas, or a combination thereof based on a gross heating value of the heated and pressurized hydrocarbon gas, wherein adjusting the volume of reflux gas includes combining NGL storage tank vapor with the volume of reflux gas. In some embodiments, the adjusting one of the feed flowrate, the feed time, the volume of the reflux gas, or a combination thereof adjusts the purity and the recovery percentage of both the light product and the heavy product. In certain embodiments, a gross heating value of the light product recovered from the heated and pressurized hydrocarbon gas is less than or equal to 1,100 Btu/scf. In some embodiments, the PSA system includes four adsorbent beds. In certain embodiments, each adsorbent bed of the four adsorbent beds cycles through eight steps asynchronous to one another. In some embodiments, the eight steps, in order, consist of feed, heavy reflux, equalization down, cocurrent depressurization, countercurrent depressurization, light reflux, equalization up and light product pressurization. In certain embodiments, the countercurrent depressurization step includes three stages at varying flowrates. In some embodiments, the PSA system includes a buffer tank, the buffer tank collecting depressurized gas from a third adsorbent bed undergoing depressurization during at least a portion of the feed time, and delivering the depressurized gas to the first adsorption bed after the feed time, wherein the reflux gas includes the depressurized gas. In certain embodiments, the pressure swing adsorption system is a vacuum pressure swing adsorption system and the second adsorption bed depressurizes to about vacuum during the feed time.

An illustrative embodiment of an improved pressure swing adsorption system for recovering hydrocarbon gas from a well, the pressure swing adsorption system includes four adsorbent beds coupled together and configured to asynchronously cycle through an eight-step adsorption process, a pair of pumps fluidly coupled to the four adsorbent beds, a first pump of the pair of pumps configured to remove heavy product from a first bed of the four adsorbent beds during a first time increment and a second time increment, a second pump of the pair of pumps configured to remove buffer gas from a second bed of the four adsorbent beds during the first time increment, and both the first pump and the second pump configured to remove heavy product during the second time increment. In some embodiments, a third bed of the four adsorbent beds is configured to receive the buffer gas from the second bed. In certain embodiments, the pressure swing adsorption system further includes a tank containing natural gas liquids and vapor formed from the heavy product, wherein the tank vapor is fluidly coupled to the third bed such that the tank vapor combines with the buffer gas to form reflux gas. In some embodiments, the reflux gas flows into a feed end of the third bed and methane flows out of a light product end of the third bed, the light product end of the third bed opposite the feed end of the third bed. In certain embodiments, the well is one of an oil well, a gas well, or a combination thereof. In some embodiments, the pressure swing adsorption system is contained on a portable unit.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figures 1, 2:
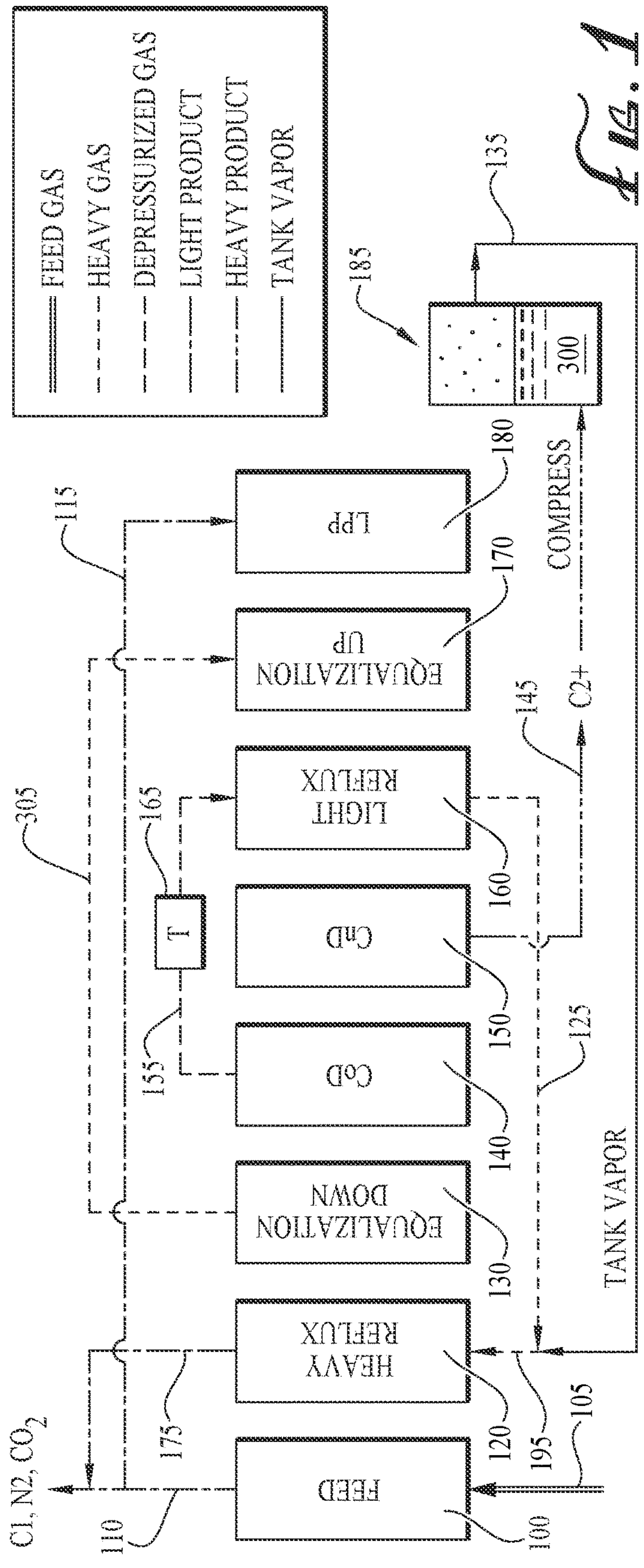
FIG. 1 is a schematic diagram of a gas processing adsorption process of illustrative embodiments.
FIG. 2 is a table of an exemplary four-bed adsorption process of illustrative embodiments for gas processing.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A portable pressure swing adsorption method and system for low flow rate gas processing will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

As used in this specification and the appended claims, the singular forms “a”, “an” and “the” include plural referents unless the context clearly dictates otherwise. Thus, for example, reference to an adsorption bed includes one or more adsorption beds.

As used in this specification and the appended claims “vacuum” means a pressure lower than atmospheric pressure (about 14.7 psia).

As used in this specification and the appended claims, “low flow rate” means 5,000,000 standard cubic feet per day or less.

As used in this specification and the appended claims, “high-quality” means at least 90 mol % purity of the specified fluid, except when in reference to natural gas, “high-quality” means a gross heating value of less than or equal to 1,100 Btu/scf.

As used in this specification and the appended claims, “light product” means natural gas consisting of at least 50 mol % methane and having the exemplary compositions as specified in Tables 2-8 herein. Those of ordinary skill in the art of hydrocarbon treatment and processing would understand the scope of “light product” in view of this definition and the examples provided herein.

As used in this specification and the appended claims, “heavy product” means gaseous alkane hydrocarbon compounds heavier than methane and having the exemplary compositions as specified in Tables 2-8 herein. Those of ordinary skill in the art of hydrocarbon treatment and processing would understand the scope of “heavy product” in view of this definition and the examples provided herein. When compressed and/or cooled, heavy product forms natural gas liquids (NGL) and NGL vapor.

As used in this specification and the appended claims, “light reflux” and “heavy reflux” are intermediate steps in the process of illustrative embodiments for the separation and collection of heavy product and light product, which circulate intermediate gas that on average is heavier than light product but lighter than heavy product, in a manner more specifically described herein.

As used in this specification and the appended claims, “rich” in reference to natural gas, means gas having an energy content per standard cubic foot that exceeds typical natural gas pipeline specifications.

As used in this specification and the appended claims, a “remote location” refers to a location that does not have access to existing infrastructure allowing for commodity market access, in most instances such commodity market access requires pipeline infrastructure to the trading hubs or major consumption centers, such as, for example, Henry Hub, Waha, or Chicago Citygate.

In the art of hydrocarbon treatment, alkane hydrocarbon compounds having two carbon atoms in a chain per molecule are typically referred to as C2, hydrocarbon compounds having three carbon atoms in a chain in a molecule are referred to as C3, etc. For example, methane may be referenced as C1, ethane as C2, propane as C3, and so on. The annotation C2+ refers to alkane hydrocarbon compounds having two or more carbon atoms in a chain per molecule of the hydrocarbon, such as ethane, propane, butane and heavier hydrocarbons.

While for ease of description and so as not to obscure the invention, illustrative embodiments herein are described in terms of oil and/or gas wellsite processing of associated gas or rich gas. However, illustrative embodiments are not so limited and may be equally applicable to situations outside of a wellsite. For example, application of illustrative embodiments may add additional capacity to existing gas processing systems as a simple bolt-on to recover some of the richer hydrocarbons coming into the facility, without actually building a new cryogenic unit or other mechanically complex liquids recovery process.

For ease of description and so as not to obscure the invention, illustrative embodiments are primarily described herein in terms of vacuum pressure swing adsorption (VPSA) system, where the adsorption beds of the system of illustrative embodiments may be brought down to vacuum during the lowest pressure steps of the pressure swing adsorption cycle of illustrative embodiments. However, illustrative embodiments are not so limited and may be employed with a pressure swing adsorption (PSA) system that does not reach vacuum pressure. Those of skill in the art may appreciate that use of a vacuum may result in higher purity and recovery of light product and heavy product, and therefore that omission of a vacuum may affect (lower) the purity and/or recovery of the light product and heavy product.

Illustrative embodiments may provide a portable and compact gas processing system that may be mobilized in and out of the field and may therefore be economical for stranded gas assets or infrastructure constrained locations, where gas would otherwise be flared. Illustrative embodiments may improve both the recovery of heavy hydrocarbons and the purity of the methane in raw natural gas, which may be used to provide last mile electricity or grey hydrogen and other more environmentally productive products than the conventional flaring of stranded assets. Illustrative embodiments may provide treatment of associated gas from low flow rate wells, such as wells with 5,000,000 standard cubic feet per day (scfd) or less. Illustrative embodiments may process associated gas at a wellsite rather than at a centralized location, to produce both pipeline quality natural gas and a NGL product. Illustrative embodiments may provide a single design that has a low capital cost since complex infrastructure is not required, may be portable and robust enough to meet a wide range of low inlet pressures and gas compositions, while still maintaining very high purity and recovery of both methane and NGLs.

Illustrative embodiments may remove ethane from both the light and heavy products, and use the ethane instead for onsite power generation or purging of the methane from the adsorption bed to produce a higher purity light product. This may provide the benefit that the heavy product need not be concerned with meeting an ethane specification or the percentage recovery of ethane, and further improve the purity of the light product.

Illustrative embodiments may include a cocurrent rinse and/or purge step after the feed step referred to herein as a “heavy reflux step”, which may provide the dual benefit of improving heavy product enrichment and light product enrichment. The reflux gas flowed through the adsorption bed for such rinse may be tank vapor obtained from the recovered NGL product storage tank, may be recovered from the gas produced after heavy product recovery in the pressure swing adsorption (PSA) and/or vacuum pressure swing adsorption (VPSA) cycle of illustrative embodiments, or may be a combination of tank vapor and gas produced after heavy product recovery. With respect to the latter, this heavier gas or “light reflux” may be produced in an equalization step post-vacuum from the pressurized cocurrent depressurization (CoD) gas after it transits from the buffer tank into the adsorbent bed that has previously been depressurized under vacuum. With respect to the former, rinsing with tank vapor may create an “open” cycle, rather than a “closed” cycle providing the benefit of increasing and/or adjusting the volume of reflux gas used for the cocurrent rinse during the heavy reflux step. The reflux gas may displace methane from the adsorbed phase near the feed end of the bed and flush the methane toward the light product end of the bed, effectively filling both the adsorbed and gas phases in much of the bed with only the heavy product, while continuing to produce light product.

Much, if not all, of the heavy product (in both adsorbed and gas phases) may be recovered during a countercurrent depressurization step and countercurrent purge step referred to herein as a “light reflux step,” again resulting in a heavy product that is more enriched in the heavy component. Increasing or optimizing the volume of reflux gas for this "rinsing" of the absorbent bed enhances the purity and recovery of both light product and heavy product. This novelty or ability to optimize and even increase the heavy reflux volume from multiple heavy product sources including from sources outside the system/cycle, allows the current process to be even more flexible or accommodating to changes and variability in gas compositions that may be handled by the VPSA system of illustrative embodiments.

Illustrative embodiments may handle a wider range of inlet gas compositions than conventional VPSA cycles, while still maintaining the purity and recovery of the methane and/or light product. For example, illustrative embodiments may accommodate 1,150 Btu/scf to 1,700 Btu/scf inlet gas by optimizing heavy reflux volume and the length of heavy reflux step within the cycle of illustrative embodiments. This may be especially relevant for wellsite or remote applications, where the gas compositions and flow rates are variable and the lack of infrastructure in place prevents the blending of gas streams or gas compositions.

Illustrative embodiments provide a high temperature near-isothermal process primarily at 100-150° C., at 100° C., at at least 100° C. or at about 100° C., which may bring and/or maintain all hydrocarbons present in the feed gas in a gaseous phase, which may minimize the adsorption of methane, may aid in the desorption of heavier hydrocarbons, and may simplify the steps that would otherwise be required in a lower temperature VPSA process. This higher temperature also improves the regeneration of the adsorbent thereby maintaining maximum working capacity of the adsorbent beds. An inlet heater may be employed or a heat exchanger may reuse some of the heat generated through compression to heat the feed gas prior to VPSA inlet. Feed gas may be passed through a single stage of compression prior to entering the VPSA inlet to bring the feed gas to a pressure of about 100 psia, 150 psia or 50-215 psia.

Adsorbent beds may be columns containing one or more adsorbents. An adsorbent of illustrative embodiments may be layers of high porous activated carbons. Silica, zeolites, molecular sieves, metal organic frameworks and/or alumina may also be employed as adsorbents. Exemplary adsorbents are offered by Cabot (Georgia, USA), Calgon Carbon Corporation (Pennsylvania, USA), and Ingevity (South Carolina, USA). Adsorbents may be packed inside columns (beds) with loading access at both ends to form the adsorbent bed. An orifice and pressure regulator may provide precise gas flow through the bed. A back-pressure regulator may place the system under a presetting pressure. The connection of a vacuum pump or fluid differential pressure pump may favor the regeneration ability for the adsorbents.

Gas Processing Overview

Illustrative embodiments may include an adsorption and desorption cycle having four adsorbent beds, and with each bed cycling through eight steps. Additional beds and steps may be incorporated based on composition and flow rate of feed gas and the number of equalization steps desired, balanced against footprint and cost considerations. Each bed may interact with one another to provide an efficient cycle producing, for a wide range of composition of feed gas input, both: (1) a high methane mol % natural gas product referred to herein as light product, and (2) a NGL product referred to herein as heavy product. Each of the beds may be processing gas at any given time increment, with each bed at a different step in the cycle of illustrative embodiments at such time increment. As such, if one bed is on a step that moves gas to another step, the gas may flow from one bed to another. FIG. 1 illustrates a schematic diagram overview of a gas processing process of illustrative embodiments. FIG. 2 is a table providing the relative process step of each bed at each time increment as the beds cycle through the process of FIG. 1, with each bed at a different phase of the cycle at differing times. Table 0 provides an illustrative example of operating conditions including the timing of the steps shown in FIG. 2. The operating conditions of Table 0 are exemplary only and intended to be non-limiting.

TABLE 0

Exemplary Operating Conditions of Illustrative Embodiments

| Operating Conditions | |
|---|---|
| x, s | 220 or 540 |
| y, s | CT/4-140-x |
| HR and LR time, s | 100 + x |
| Feed and CnD time, s | CT/4 |
| CoD and LPP time, s | y |
| CoD Pressure, Psia(kPa) | 23.3 (160) |
| Cycle Time (CT), s | 1920 or 3840 |
| Feed and HR Pressure, Psia | 100.0 |

Vacuum Pressure Swing Adsorption (VPSA) Process Steps

Turning to FIG. 1, to better understand the following description, make reference to FIG. 2, following along across row 200. This description is from the perspective of Bed A for ease of description and so as not to obscure illustrative embodiments. Those of skill in the art will understand that the description could similarly follow the perspective of Bed B, Bed C or Bed D. At feed step 100, feed gas 105 may first be pressurized using a single stage of compression for example inlet compressor 805 (shown in FIG. 6), multiple stages of compression and/or one or more pumps, such as a centrifugal pump or fluid differential pressure pump, to bring feed gas 105 up to a pressure of 50-215 psia. In illustrative embodiments, only a single stage of compression may be necessary to permit small scale treatment. Compression and/or pressurization of feed gas 105 may decrease the size and/or footprint of the system of illustrative embodiments. Output pressure of feed gas 105 may depend upon wellhead pressure and the number of stages of compression. In the example of FIG. 1 and Table 0, feed gas 105 may be brought to 100 psia.

Feed gas 105 may also be heated to 100-150° C. A heater may be employed to heat feed gas 105 and/or heat exchanger 505, such as a double tube heat exchanger, shell-and-tube heat exchanger, tube in tube heat exchanger, or plate heat exchanger, may be employed to recirculate some of the heat generated through compression to heat the gas prior to inlet into Bed A. Heating feed gas 105, such as to 100-150° C., may maintain the hydrocarbons feed gas 105 in a gaseous phase, may minimize adsorption of methane into the adsorbent and may help regenerate the adsorbent bed by providing more energy for desorption. In some embodiments, lower regeneration temperatures may be employed as a tradeoff with performance. The cycle of illustrative embodiments may be isothermal and/or substantially adiabatic.

Feed gas 105 may be a mixture of various continuous-chain alkane hydrocarbons, such as methane, ethane, propane, butane, pentane and/or octane and/or may be associated gas from a production well, such as an oil well or gas well rich in natural gas. Contaminants such as nitrogen gas, carbon dioxide, water and/or hydrogen sulfide may also be present in feed gas 105 and/or may be removed prior to entry into Bed A. Bed A may include layers of activated carbon, silica, zeolites, molecular sieves, metal organic frameworks, alumina, or another similar adsorbent that may adsorb C2+ or C3+ hydrocarbons and produce a non-adsorbed methane as light product.

At feed step 100, feed gas 105 may flow through Bed A. The throughput during feed step 100 may for example be pumped through Bed A at 4,000 standard liters per minute or approximately 200,000 scfd. Hydrocarbons in feed gas 105 heavier than methane, or hydrocarbons heavier than ethane, such as propane and/or butane, may be adsorbed by the adsorbent, whilst the methane and/or methane with some ethane may pass through Bed A without adsorbing and the gas may be collected as light product 110. Other impurities such as nitrogen gas and carbon dioxide may also pass through Bed A during feed step 100. Portion 115 of gaseous light product 110 may be diverted to light product pressurization (LPP) step 180 to increase the pressure of another bed that has already desorbed the heavy hydrocarbons and thus been regenerated. For example, as shown in row 240 of FIG. 2, Bed D may undergo LPP step 180 at the same time Bed A undergoes feed step 100, therefore a portion 115 of gaseous light product 110 from Bed A, may flow to Bed D for pressurization of Bed D, in preparation for Bed D to repeat feed step 100. Portion 115 of gaseous light product 110 may be used to re-pressurize the bed at the very end of the cycle (i.e., LPP step 180) in order to set up to restart the cycle.

Heavy reflux step (HR step) 120 may follow feed step 100 in the adsorption cycle of illustrative embodiments. Buffer gas 125, which may be heavy gas from buffer tank 165, may be flowed from buffer tank 165, through a bed undergoing light reflux step (LR step) 160 and then flushed through Bed A during heavy reflux step 120, in order to further remove and/or flush any light product 110 that may not have been removed from Bed A during feed step 100. Buffer gas 125 may be heavier hydrocarbons than methane, and thus be more inclined to attach to the adsorbent than the methane. Thus, buffer gas 125 may push, flush and/or remove any remaining light product 110 from the adsorbent and/or Bed A. This expungement/removal of light gas with heavier gas in the bed may serve to concentrate/load the bed with heavy gas in preparation for depressurization and enhanced heavy product 145 recovery. Buffer gas 125 may be compressed and/or pressurized up to feed gas pressure prior to flowing through a bed undergoing HR step 120. In the example of FIG. 2, Bed C may be undergoing LR step 160 whilst Bed A is undergoing HR step 120, and therefore in this example, buffer gas 125 may flow from Bed C to Bed A during heavy reflux step 120. Any unadsorbed methane 175 emerging from Bed A during heavy reflux step 120 may join light product 110 from feed step 100 and/or may be further treated, collected, stored, compressed, liquefied and/or transported.

In some embodiments, tank vapor 135 may be introduced into Bed A during HR step 120. Tank vapor 135 may be vapor formed from compressed heavy product 145. Heavy product 145 exiting a bed undergoing countercurrent depressurization step (CnD step) 150 may leave the bed at approximately 3 psia and be compressed with heavy product compressor 510 to about 265 psia for storage and/or transport of such heavy product 145. When compressed, C2+ or C3+ hydrocarbons may liquefy and ethane and/or at least a portion of the relatively lighter hydrocarbons contained within heavy product 145, may form as tank vapor 135. Tank vapor 135 may be employed to further push any additional unadsorbed methane 175 into light product 110, further increasing the mole percentage recovery and/or purity of methane in light product 110. Tank vapor 135 may dope and/or be combined with buffer gas 125 to form reflux gas 195 entering Bed A during heavy reflux step 120. Using tank vapor 135 to increase the volume of buffer gas 125 and/or reflux gas 195 may improve purity and/or recovery of light product 110 and/or improve the ability to manage gas composition fluctuations.

In some embodiments, tank vapor 135 may remove ethane from heavy product 145, which may be particularly desirable if ethane is not wanted or needed in heavy product 145 and/or to remove the need to meet ethane specifications and/or remove concerns related to ethane recovery. Tank vapor 135 may be enriched gaseous heavy product 145 obtained from storage tank 185, which storage tank 185 may contain recovered NGL. Buffer gas 125 used for reflux purposes may be produced through depressurization steps in the VPSA cycle (for example, steps 130-160). Reflux gas 195, which may include buffer gas 125 and/or tank vapor 135, may displace the light component (light product 110) from the adsorbed phase near the feed end of the bed and flush the light product 110 downstream toward the light product end of the bed, instead filling both the adsorbed and gas phases in much of the bed with heavy product 145, while continuing to produce either a pure light product 110 or a gas stream with a composition with much of the heavier hydrocarbons already adsorbed. Most and/or all of reflux gas 195 may be recovered during the subsequent countercurrent depressurization step 150 and/or cocurrent depressurization step 140 with light reflux step 160, again resulting in heavy product 145 that is more enriched in the heavy component. Increasing or optimizing the volume of reflux gas 195 for this "rinsing" of the absorbent bed may enhance the purity and recovery of both light product 110 and heavy product 145. This ability to optimize and even increase reflux gas 195 volume from multiple heavy product sources including from sources "outside" the cycle, may allow illustrative embodiments to be even more flexible or accommodating to changes and variability in gas compositions the exemplary VPSA process can handle. Illustrative embodiments may handle a wider range of inlet gas compositions than conventional adsorption processes, while still maintaining the purity and recovery of the methane and/or light product 110. Illustrative embodiments may accommodate 1150 Btu/scf to 1700 Btu/scf inlet gas by optimizing reflux gas 195 volume and the length of heavy reflux step 120 within the cycle. This may be especially relevant for wellsite or remote applications, where the gas compositions and volumes are variable and the lack of infrastructure in place prevents the blending of gas streams or gas compositions.

Equalization down step (ED step) 130 may follow heavy reflux step 120 for Bed A. During equalization down step 130, the pressure in Bed A may be reduced from the initial feed gas pressure in order to begin desorbing the hydrocarbons that initially adsorbed into the adsorbent forming Bed A. Pressure may be reduced by removing pressurized gas 305 from the product end of Bed A, and sending such pressurized gas 305 into the product end of another bed undergoing equalization up step (EU step) 170 in a countercurrent manner, Bed C in this example. Equalization down step (ED step) 130 may be the first depressurization and/or desorption step in the VPSA cycle of illustrative embodiments. The purpose of this ED step 130 may be to enrich the bed with heavy gas. In one illustrative example, pressure may be reduced from 100 psia to 50 psia during equalization down step 130. As further described herein, depressurization may occur in multiple steps and/or stages. Some of the heavier hydrocarbons, such as ethane and propane may desorb during equalization down step 130, and such pressurized gas 305 may be circulated to a bed undergoing equalization up step (EU step) 170. For example, in the embodiment of FIG. 2, when Bed A is undergoing equalization down step 130, Bed C is simultaneously undergoing equalization up step 170, so pressurized gas 305 may flow from Bed A to Bed C, thereby utilizing pressurized gas 305 to simultaneously lower the pressure within Bed A and increase the pressure within Bed C.

Cocurrent depressurization step (CoD step) 140 may be an additional depressurization step for Bed A, for example from 50 psia to 25 psia. "Cocurrent" refers to the direction of gas leaving Bed A during cocurrent depressurization step 140, which is the same direction as the flow of feed gas 105 through a bed undergoing feed step 100. Further depressurization may allow yet heavier and/or additional hydrocarbons to desorb from Bed A. Buffer tank 165 may be a buffer tank, which may provide an equilibrium step without adsorbent to help eliminate dead time or idle steps in the cycle. Desorbed, depressurized gas 155 during cocurrent depressurization step 140 may be held in buffer tank 165 and/or flowed into a bed undergoing LR step 160. Use of buffer tank 165 may also allow for additional removal of lighter gases from the bed prior to heavy product recovery under vacuum. For example, in the embodiment of FIG. 2, no bed is undergoing LR step 160 while Bed A is undergoing CoD step 140, therefore depressurized gas 155 exiting Bed A during CoD step 140 may be held in buffer tank 165 until Bed B reaches light reflux step 160. Depressurized gas 155 from cocurrent depressurization step 140 may be sent to a bed undergoing light reflux step 160 and/or circulated from a bed undergoing light reflux step 160 to a bed undergoing heavy reflux step 120.

Figure 4:
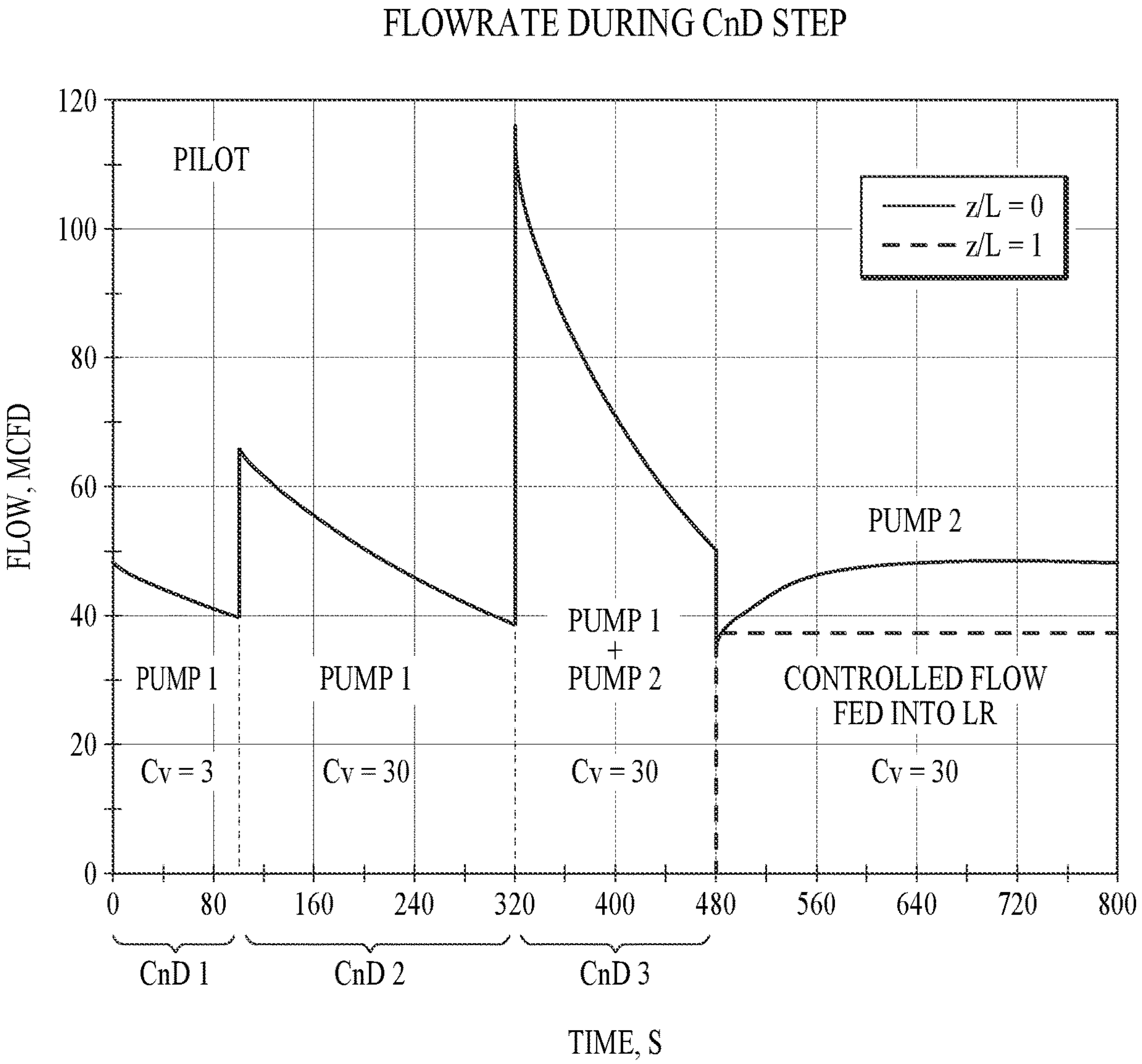
FIG. 4 is a chart illustrating flowrate changes during a cocurrent depressurization step of illustrative embodiments.

During countercurrent depressurization step (CnD step) 150, fluid exiting Bed A flows in a direction opposite the flow of feed gas and/or exits Bed A at the same side of the bed that feed gas enters Bed A. As used herein, "countercurrent" means flow in the opposite direction to "cocurrent." During countercurrent depressurization step 150, pressure is reduced inside Bed A to a vacuum and/or to the lowest pressure that will be experienced by Bed A during the adsorption/desorption cycle, for example from 25 psia to 2-6 psia or a pressure below atmospheric pressure. Pressure may be optionally reduced to vacuum. During countercurrent depressurization step 150, heavy product 145 is desorbed and/or removed from Bed A. Heavy product 145 may be C2+ or C3+ hydrocarbons and/or may be gaseous when desorbed from adsorbent within Bed A. Heavy product 145 may be compressed to about 265 psia and stored in tank 185 for delivery and/or use as NGLs. Tank vapor 135 or a portion of tank vapor 135 may be removed from tank 185 and used for heavy reflux step 120 as described herein. CnD step 150 may be broken into a plurality of stages based on pump availability, pressure and flowrate. As shown in FIG. 2 and FIG. 4, CnD step 150 may be broken into three stages: CnD1, CnD2 and CnD3. During CnD1, the pressure in Bed A may still be dropping down to vacuum, and thus the flow of heavy product 145 through and from Bed A may be reduced as provided by single CnD pump 515. CnD1 may only be necessary to protect both Bed A from experiencing high velocities and CnD pump 515, which may be a vacuum pump, from experiencing pressure greater than 1 atmosphere. This protection stage in the process of illustrative embodiments may be provided by a control valve (for example that may be part of valve system 500), upstream of the pump 515. Once the pressure in Bed A is down to vacuum and/or 2-3 psia, the throughput may be increased through the same CnD pump 515 during CnD2. During CnD3, LR step 160 for Bed B may be completed, and therefore, such LR pump 520 for Bed B may be employed for CnD 3 in Bed A, in addition to CnD pump 515, which may double the flowrate. In certain embodiments, CnD1 and CnD2 may be combined into a single CnD stage at lower bed velocities or if the bed pressure is already at atmospheric pressure.

When Bed A enters light reflux step (LR step) 160, buffer gas 125 from light reflux step 160 may be used for heavy reflux step 120 as described herein. Heavy product 145 has been desorbed and substantially removed during countercurrent depressurizations step 150. Buffer gas 125 may originate from CoD step 140 where much of the light product gas has been previously removed, this buffer gas 125 may be enriched heavy gas. Even under vacuum there may be interaction between heavy gases and adsorbent in this LR step 160. This interaction may produce buffer gas 125 that may be used for reflux purposes. Buffer gas 125 may be pumped and/or compressed and may also be heated prior to entry into a bed for use during heavy reflux step 120. Reflux gas 195 used for heavy reflux 120 may include tank vapor gas 135 originating from tank 300 and/or buffer gas 125.

During equalization up step (EU step) 170, pressure inside Bed A begins increasing to regenerate Bed A and prepare Bed A to begin adsorption once again. Pressurized gas 305 from equalization down step 130 of Bed C may be added into Bed A during Bed A's equalization up step 170 to further increase the pressure of Bed A.

During light product pressurization step 180, the pressure in Bed A is raised back up to 100 psia, 150 psia and/or the desired pressure to start back at feed step 100, such as between 50 and 215 psia. A portion 115 of light product 110 may be diverted to Bed A to increase the pressure. In the example of FIG. 2, Bed B is undergoing feed step 100 while Bed A is undergoing LPP step 180 and therefore in such example, portion 115 may flow from Bed B to Bed A.

Figure 5:
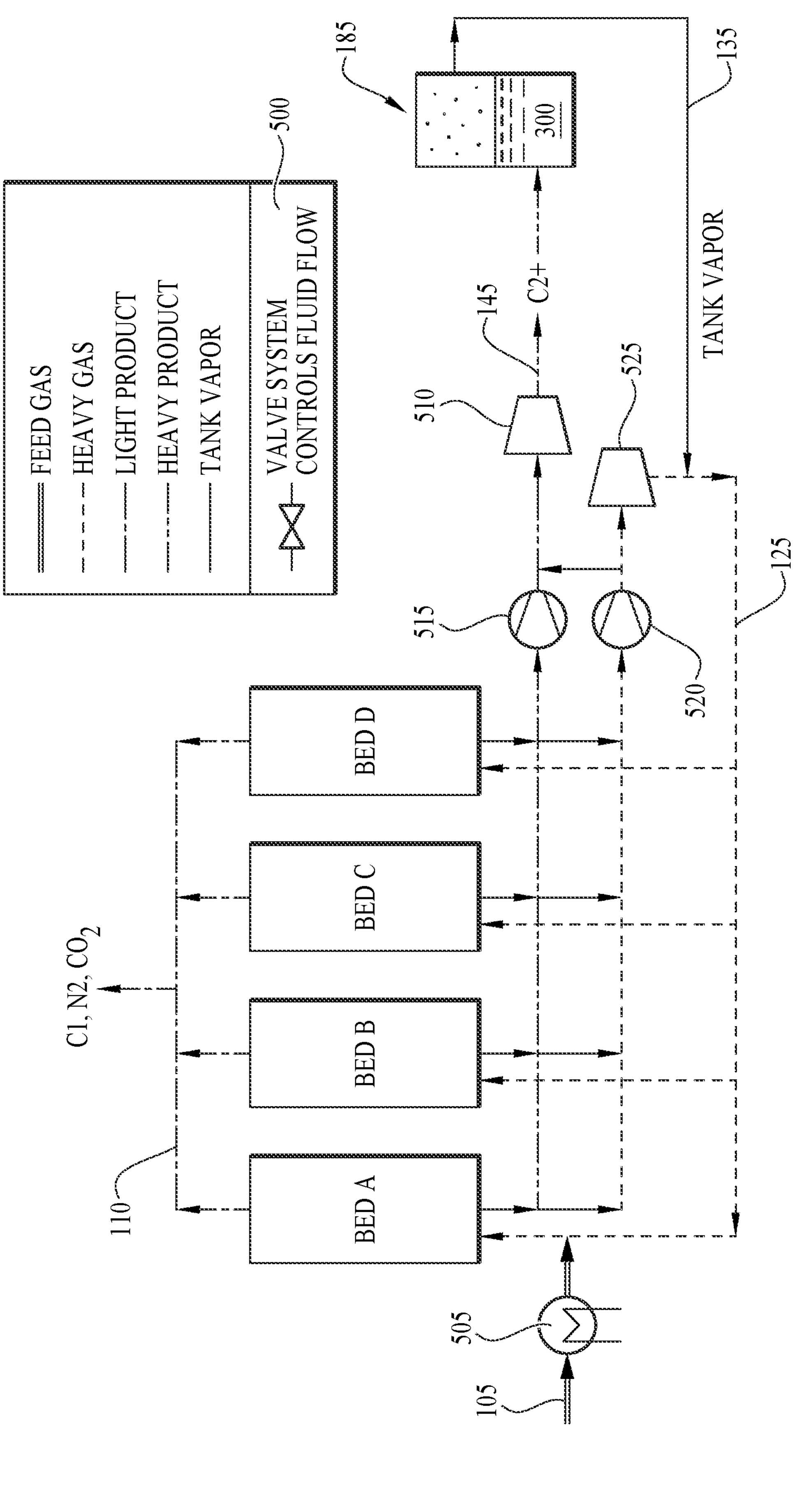
FIG. 5 is a schematic diagram of a four-bed adsorption system of illustrative embodiments for gas processing.

As illustrated in FIG. 5, piping, valve system 500, CnD pump 515, LR pump 520, heavy reflux compressor 525 and/or heavy product compressor 510 may be employed to move and pressurize fluid between beds and/or NGL tank 185. Pumps may be a vacuum pump and/or fluid differential pressure pump. For net differential, a centrifugal pump may be beneficial since the impeller imparts energy to result in a discharge pressure. A heavy product 145 vacuum or differential pressure pump, such as CnD pump 515, may remove heavy product 145 from a bed undergoing CnD step 150. Heavy product compressor 510 may increase the pressure of the heavy product 145 from 0 psig to 250 psig for storage. Heavy product compressor 510 may store NGL product 300 in tank 185, in an illustrative example. A light reflux vacuum or pressure differential pump, such as LR pump 520, may remove buffer gas 125 during light reflux step 160. Heavy reflux compressor 525 may increase the buffer gas 125 pressure to 100 psia, in this example, and send buffer gas 125 and/or reflux gas 195 to a bed undergoing heavy reflux step 120 at 50 Mscfd, for example.

Time Increments

Figure 3A:
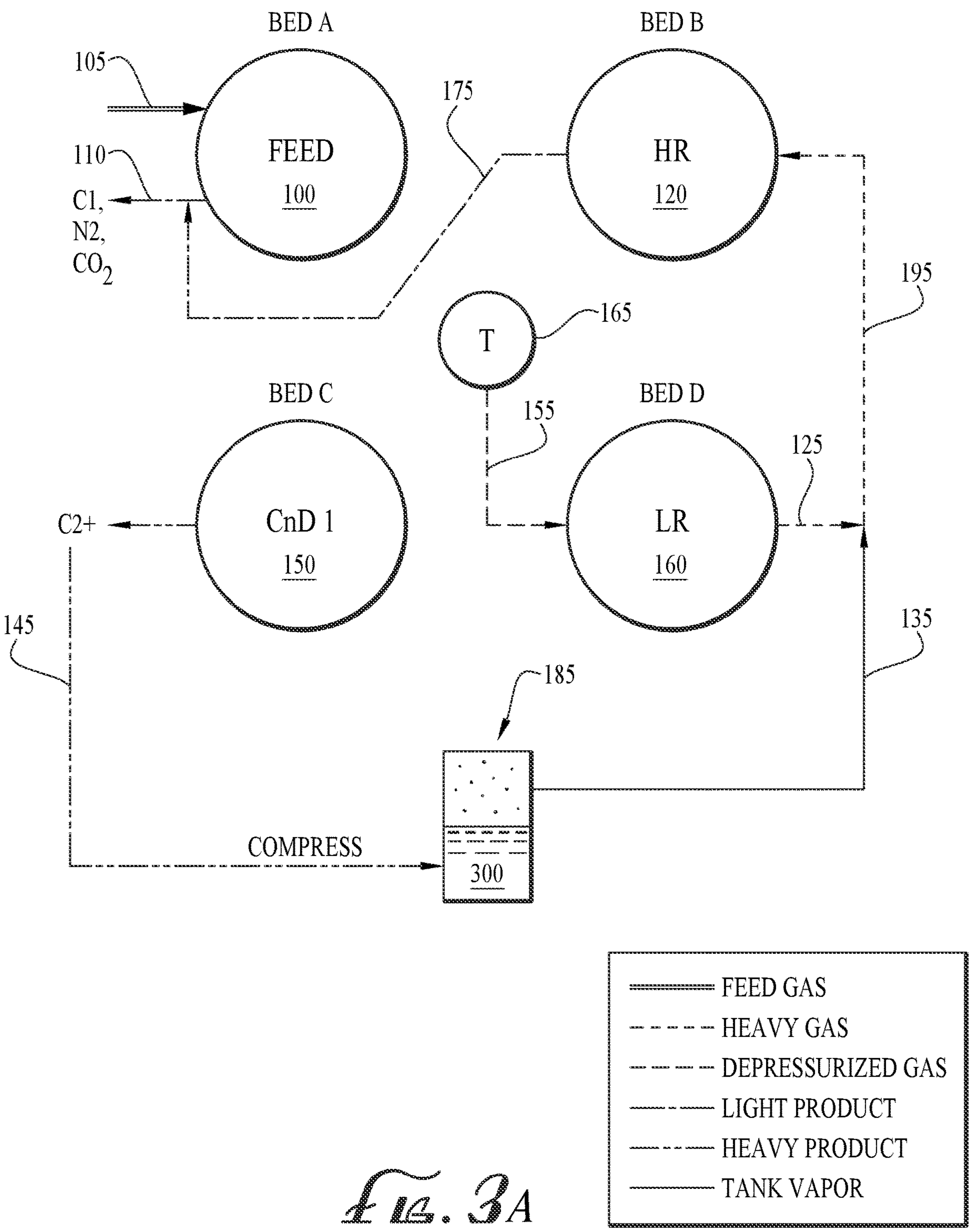
FIGS. 3A-3P are schematic diagrams of sixteen time increments of an adsorption process of illustrative embodiments.
Figure 3B:
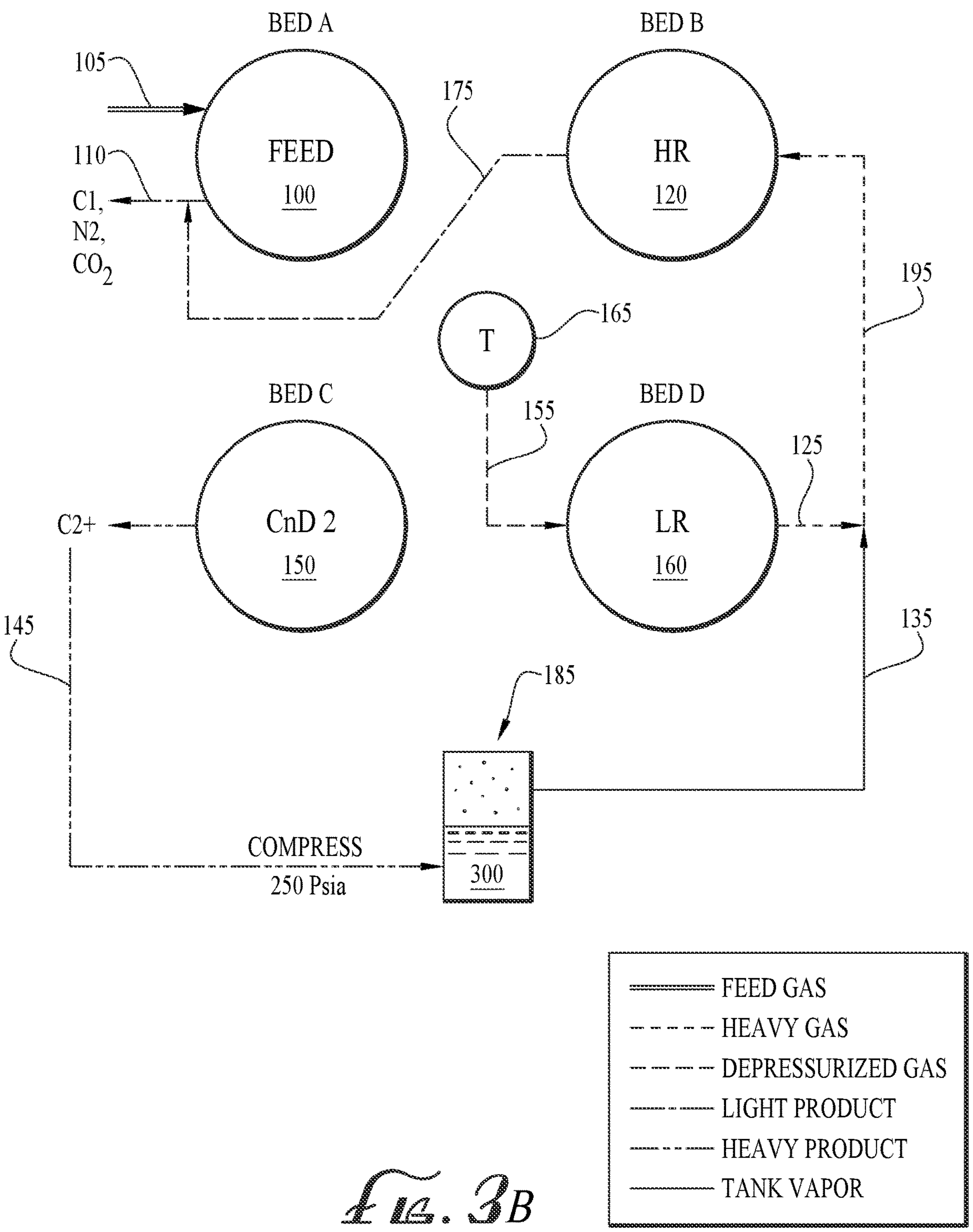
Figure 3C:
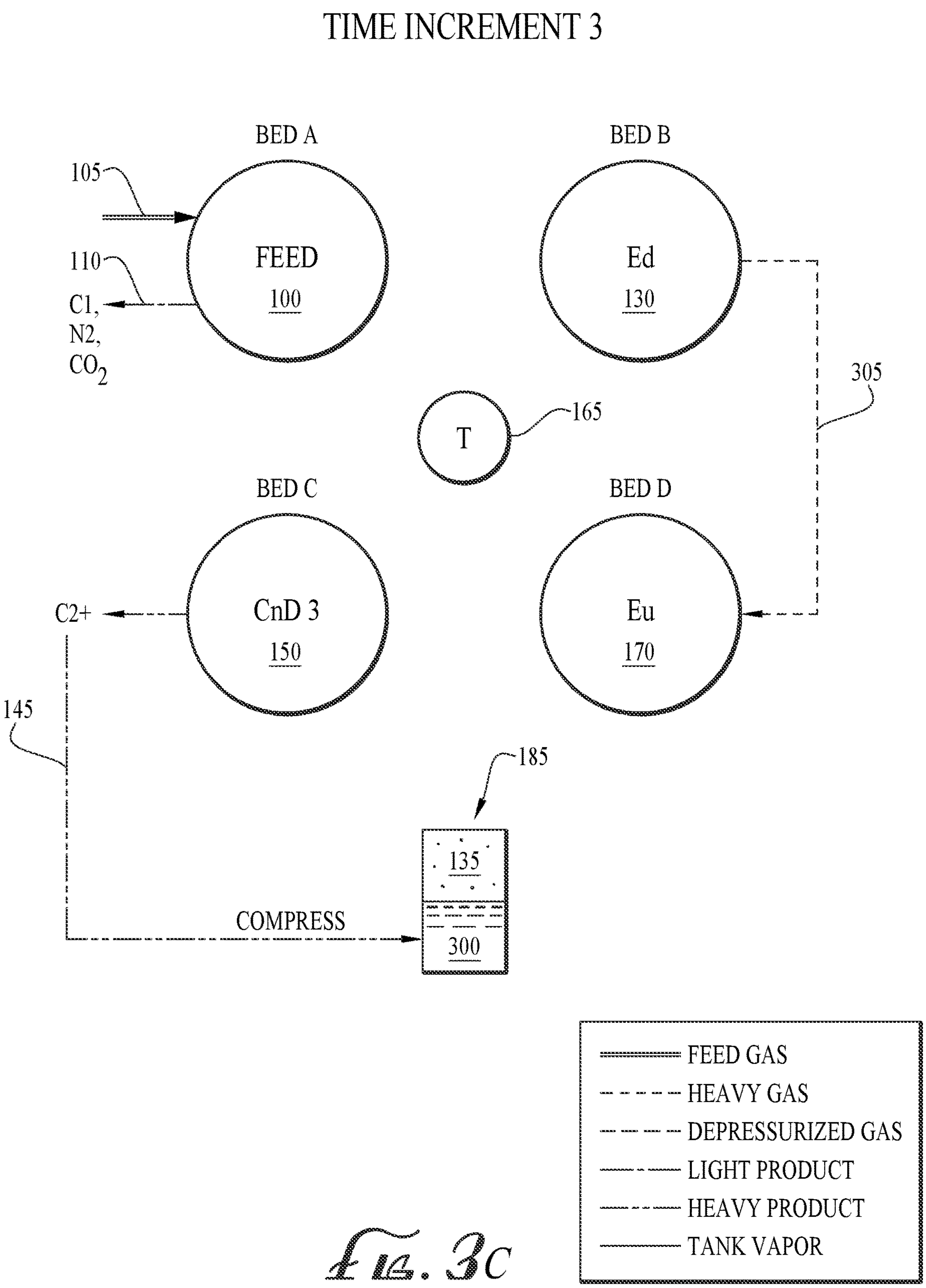
Figure 3D:
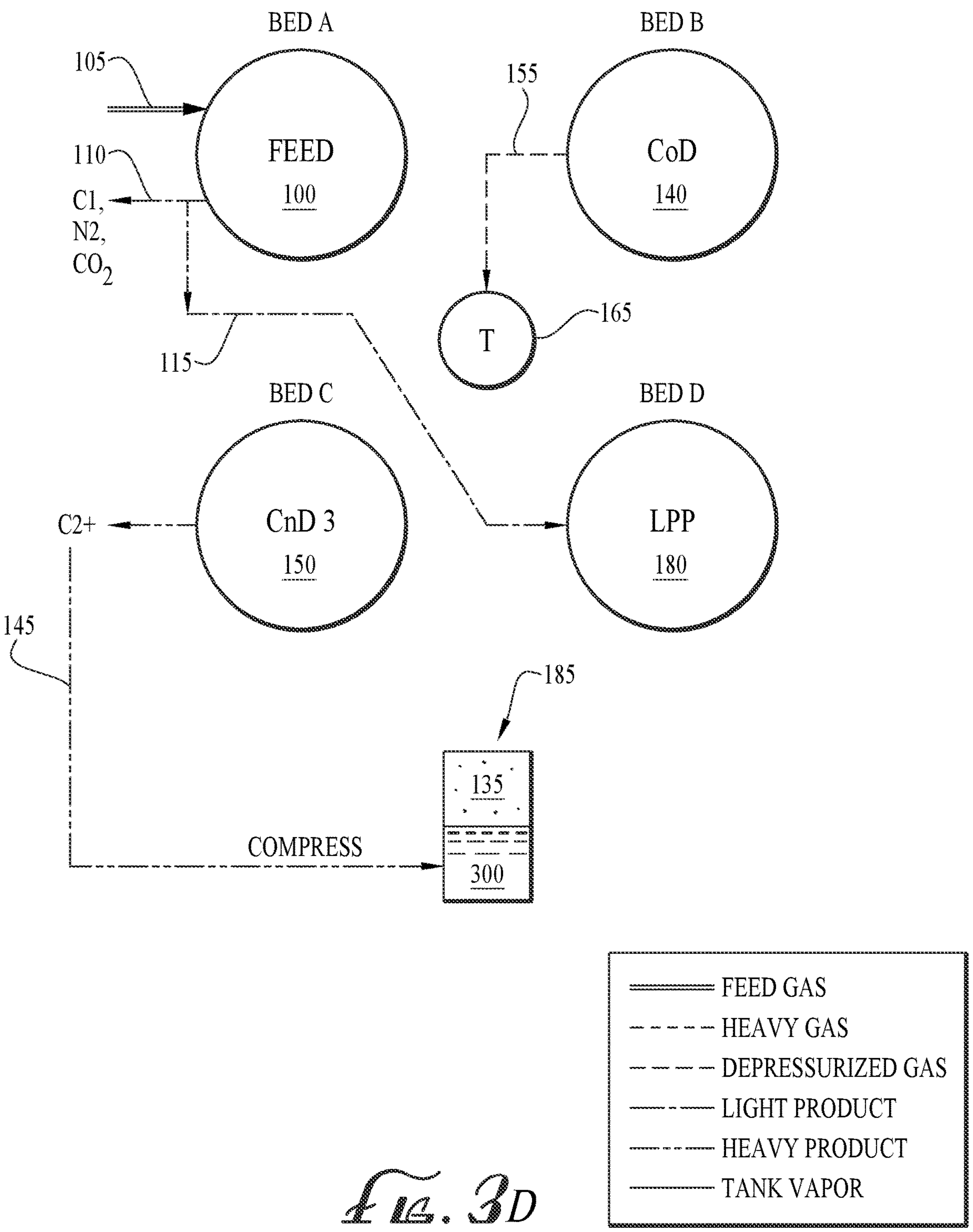
Figure 3E:
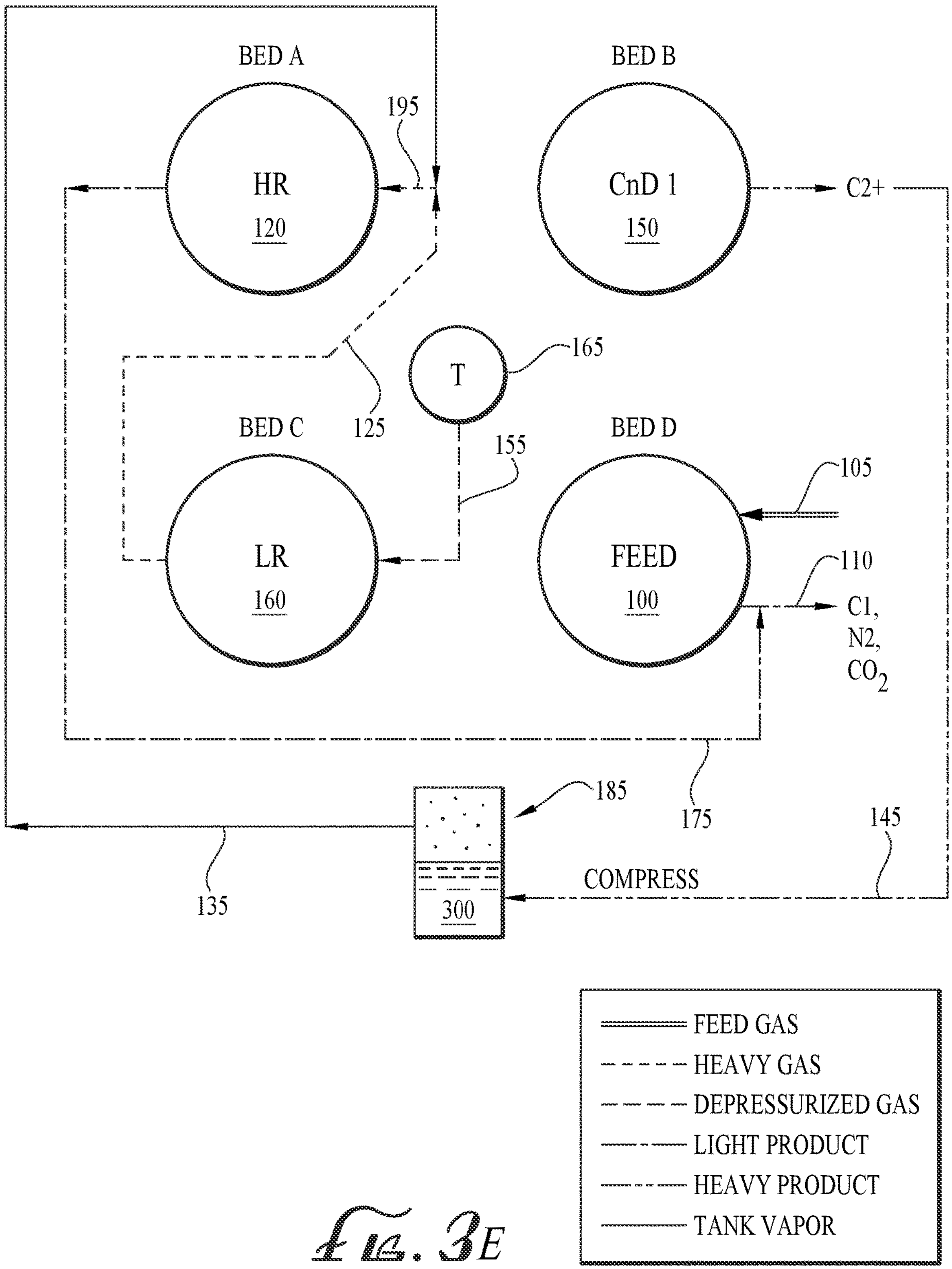
Figure 3F:
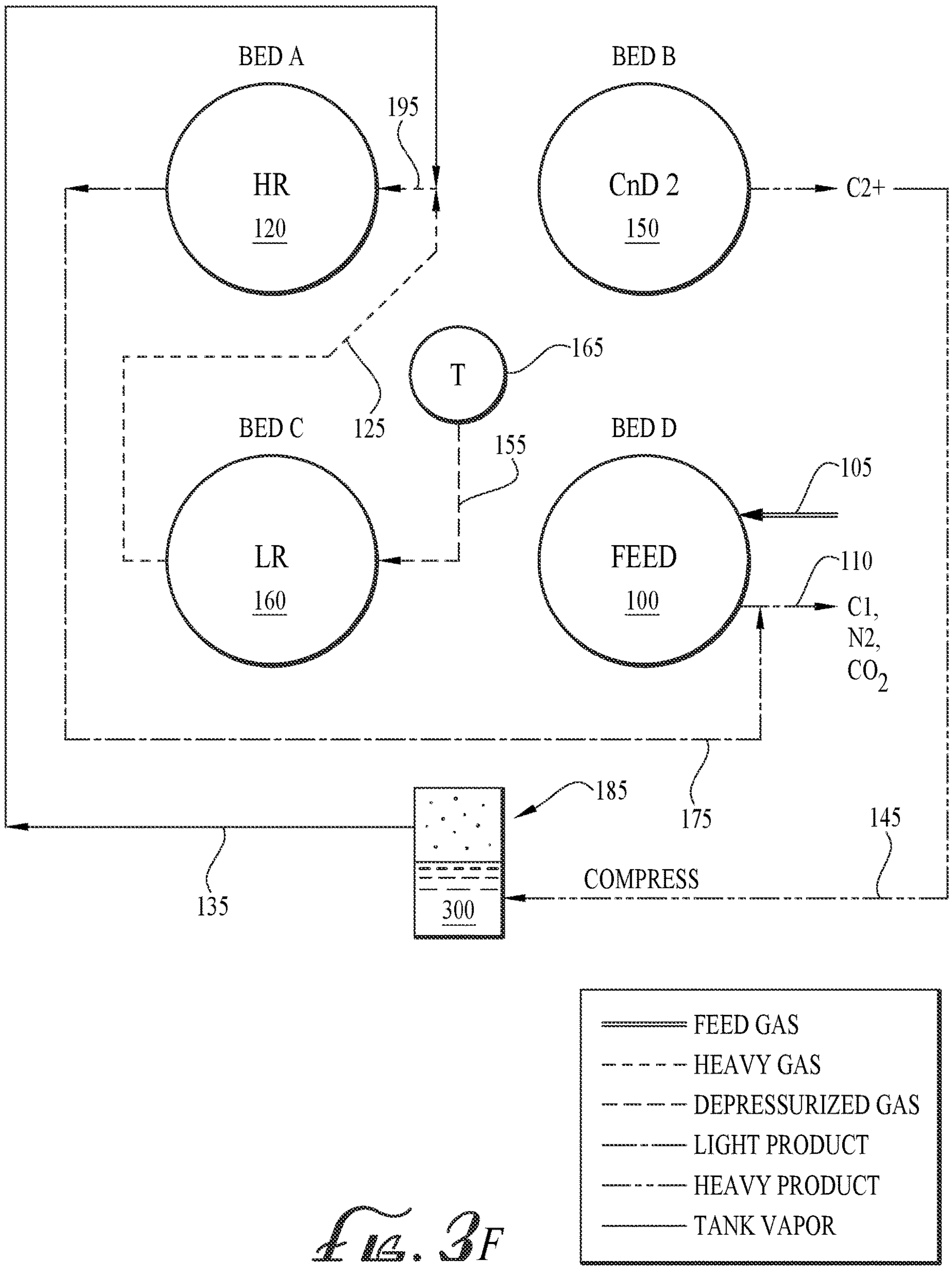
Figure 3G:
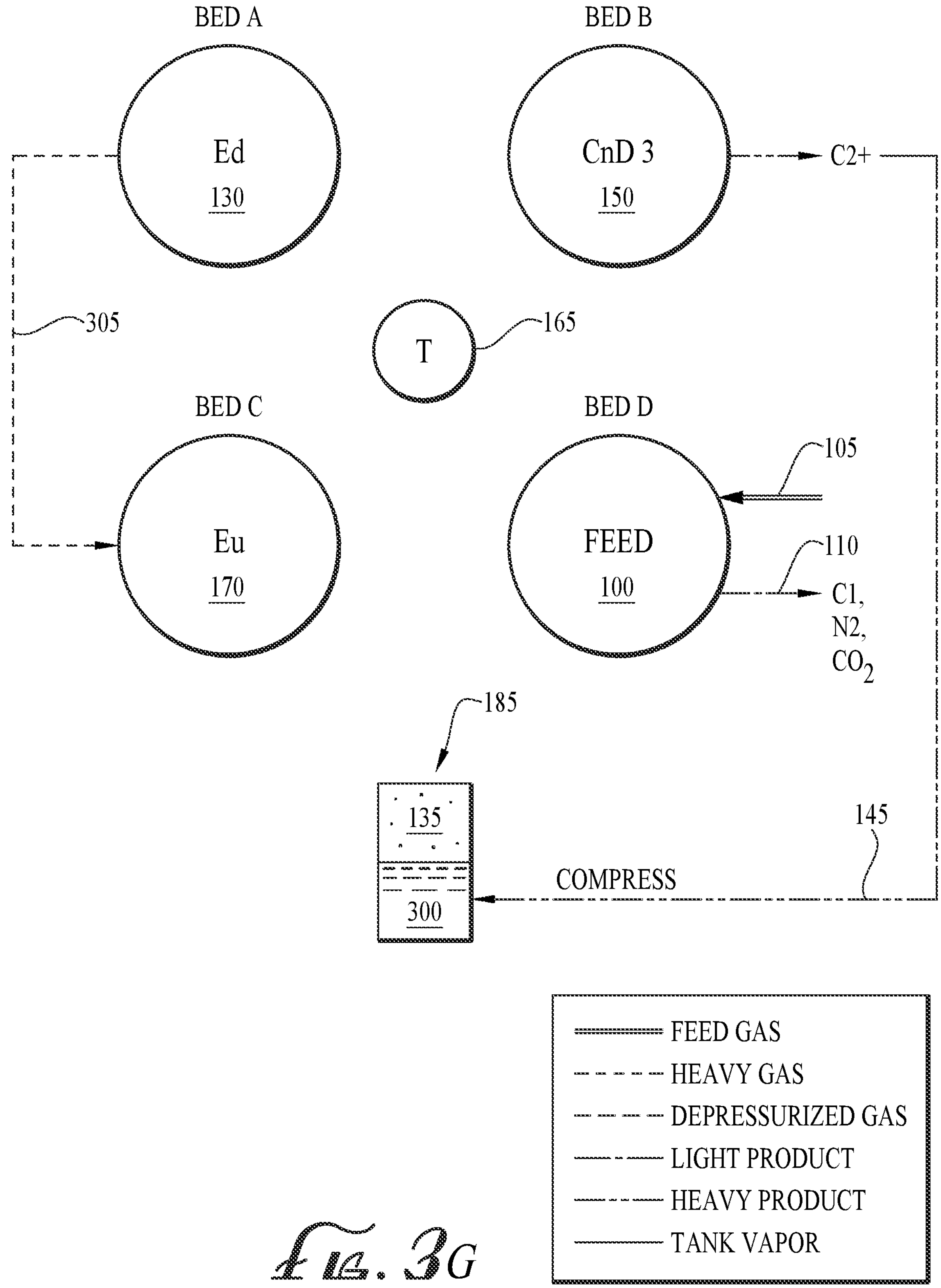
Figure 3H:
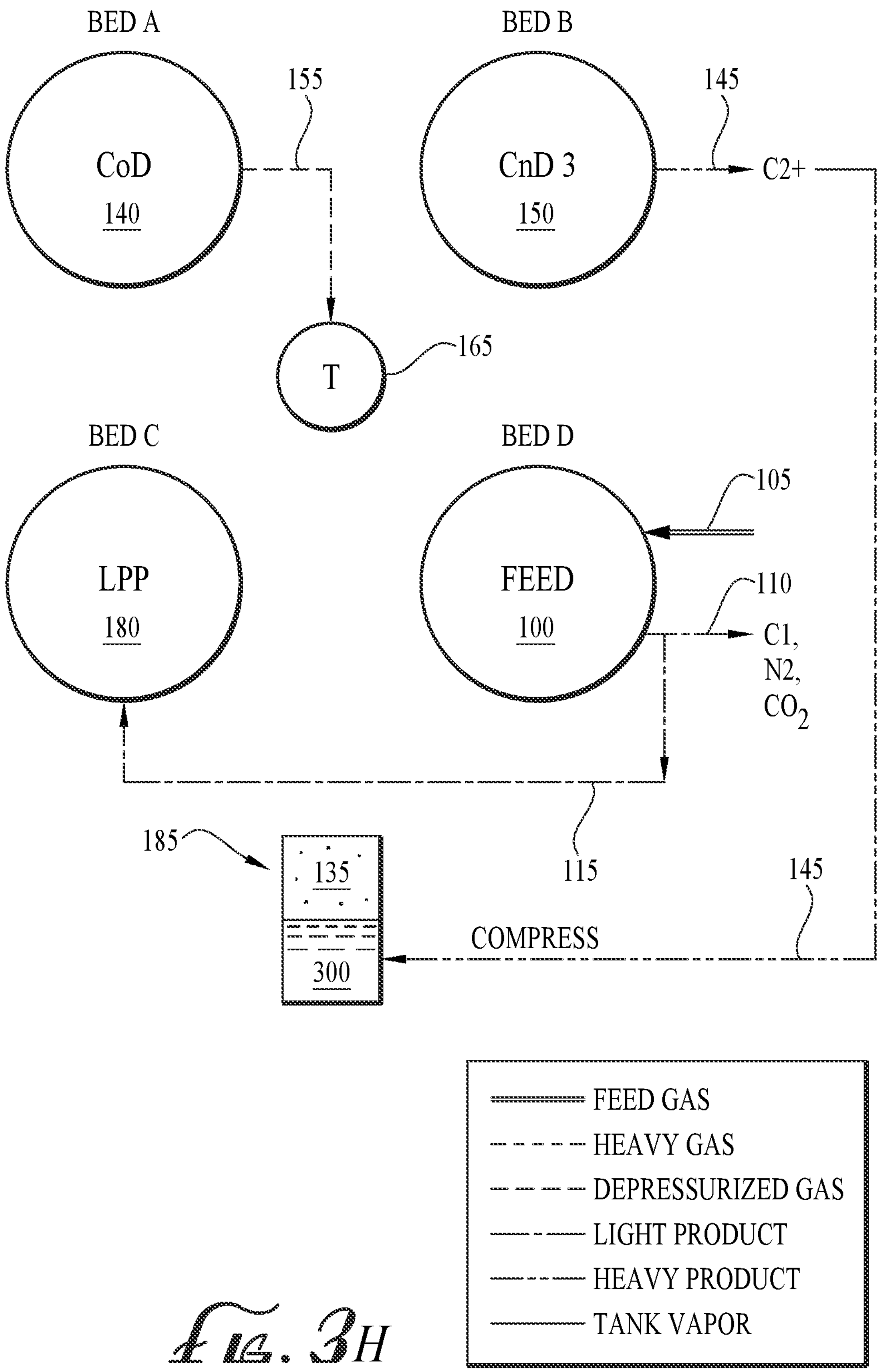
Figure 3I:
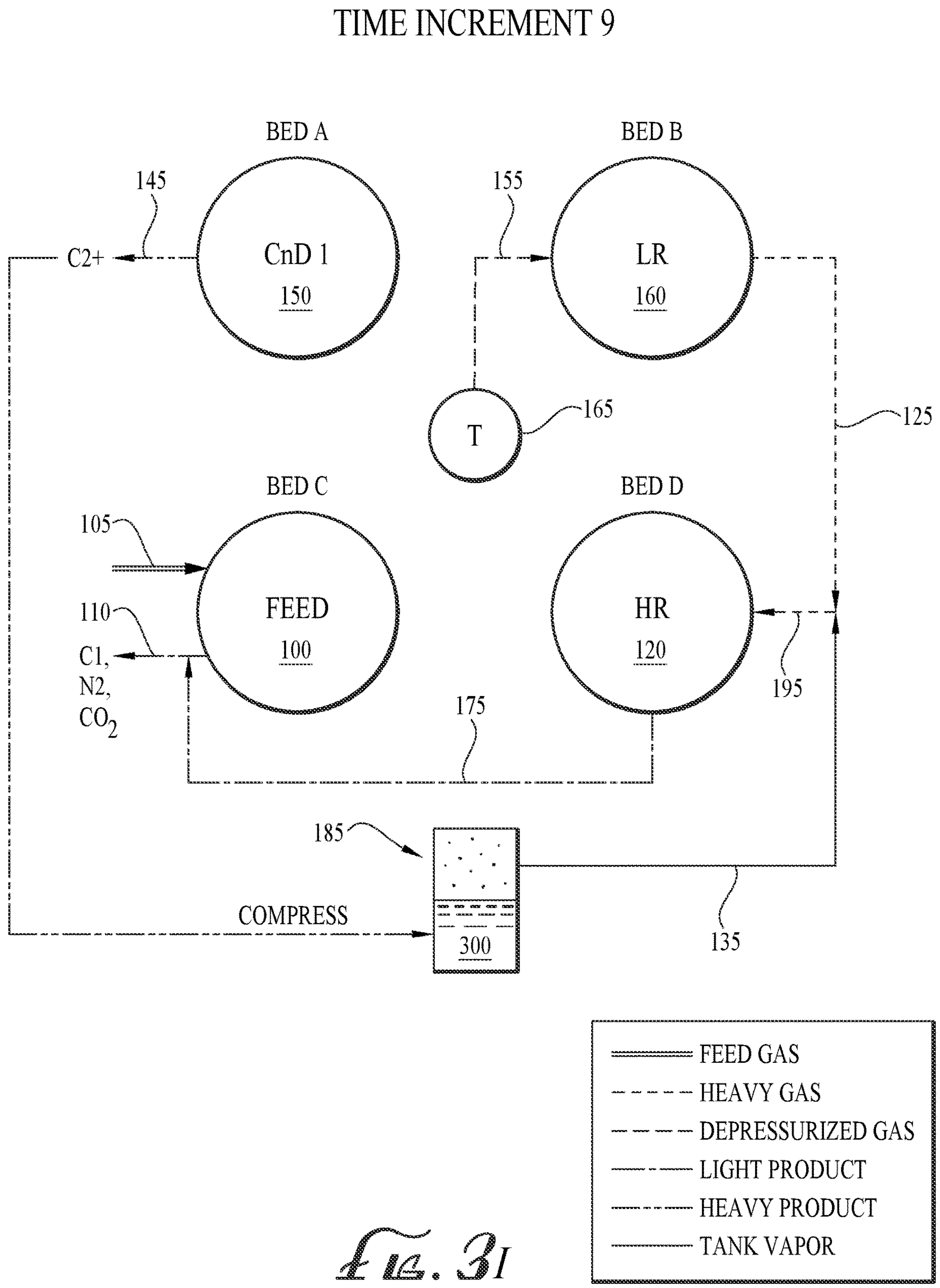
Figure 3J:
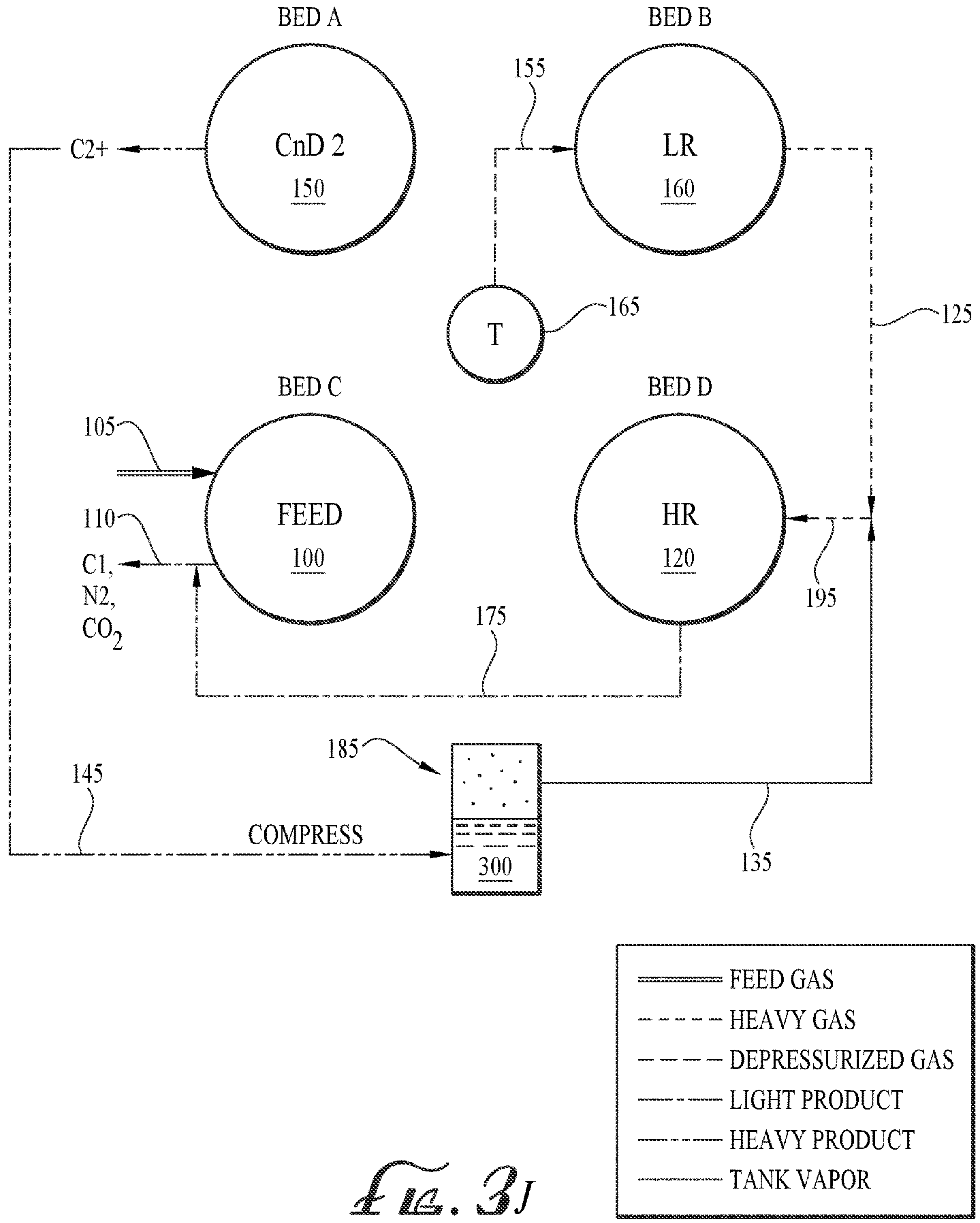
Figure 3K:
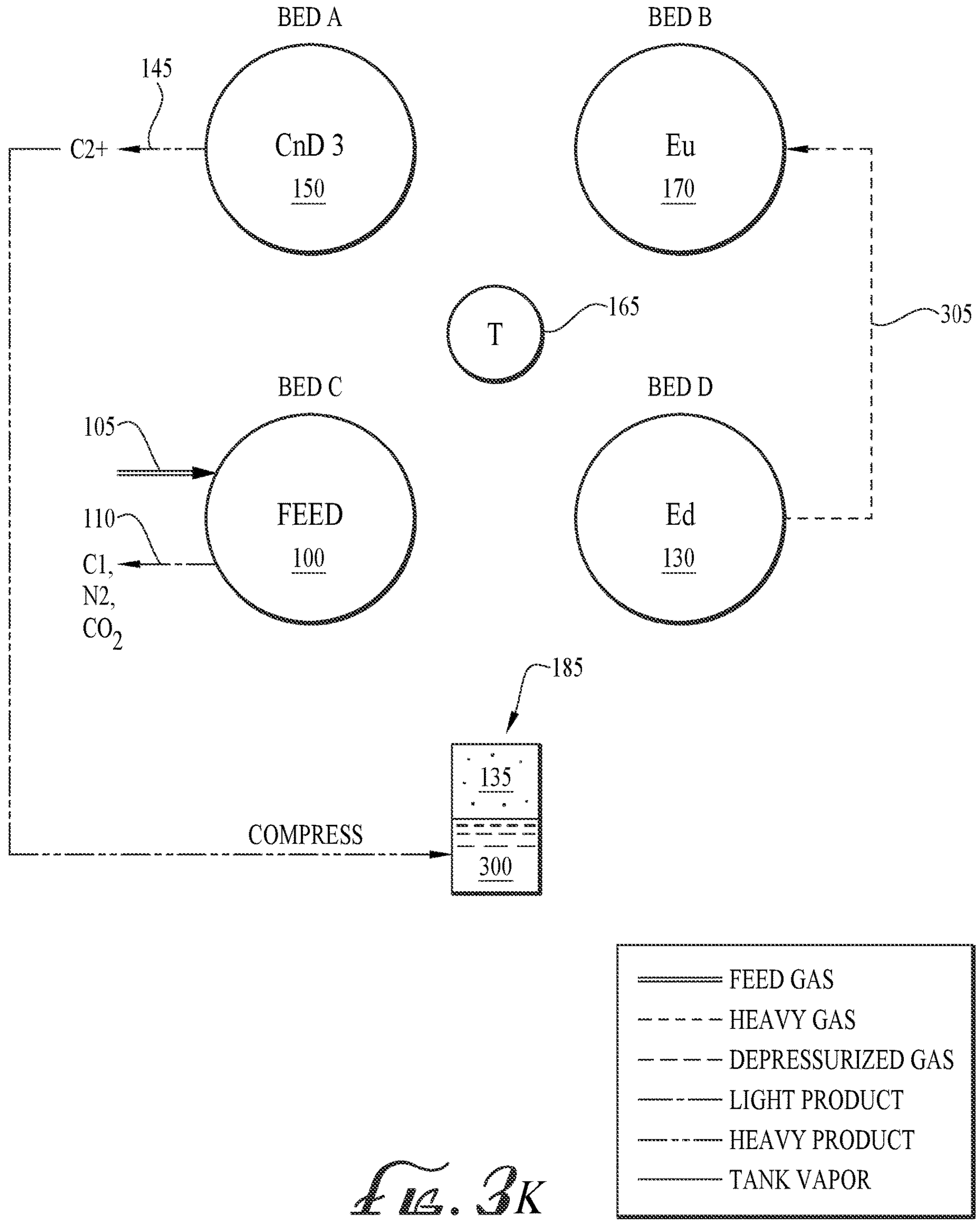
Figure 3L:
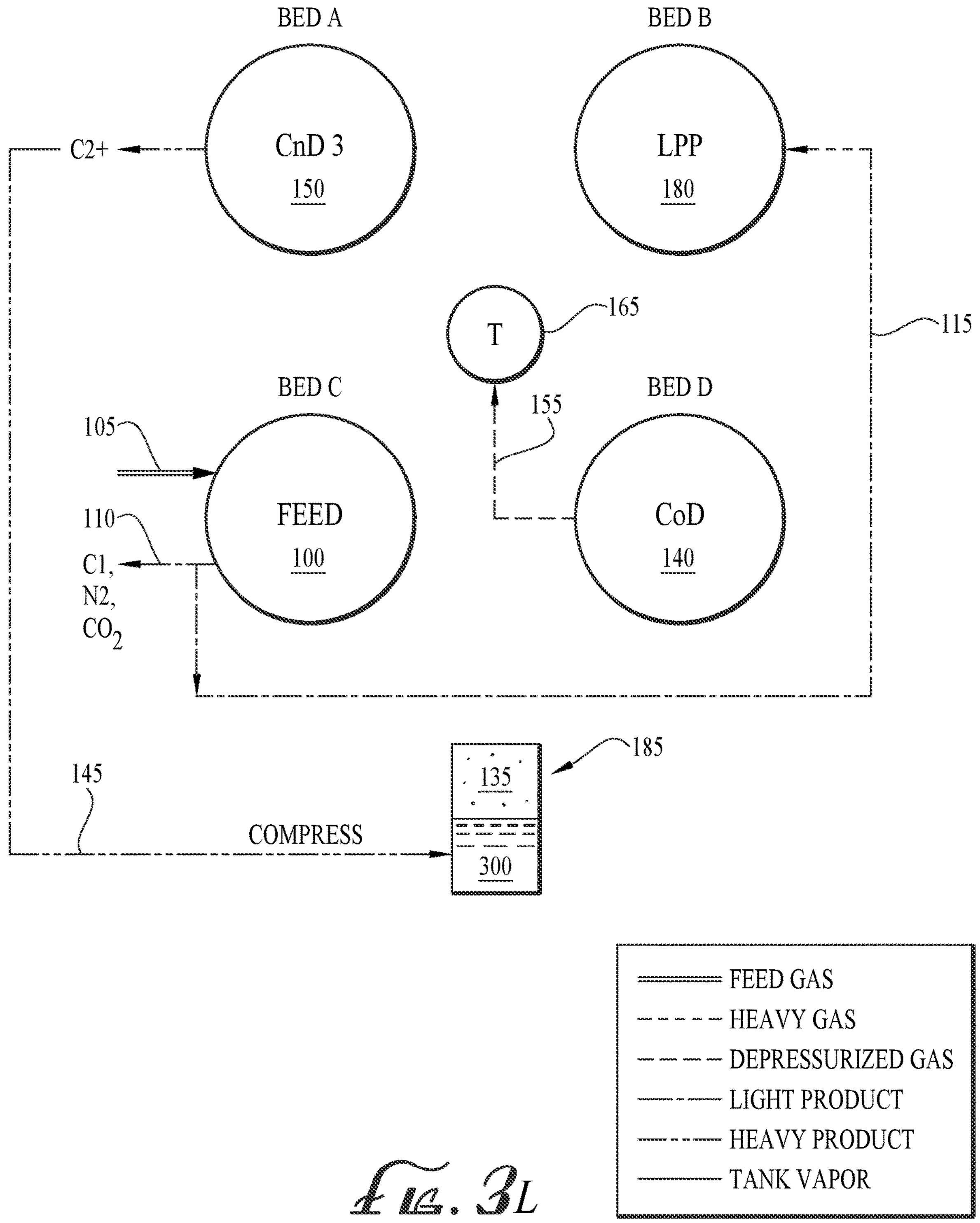
Figure 3M:
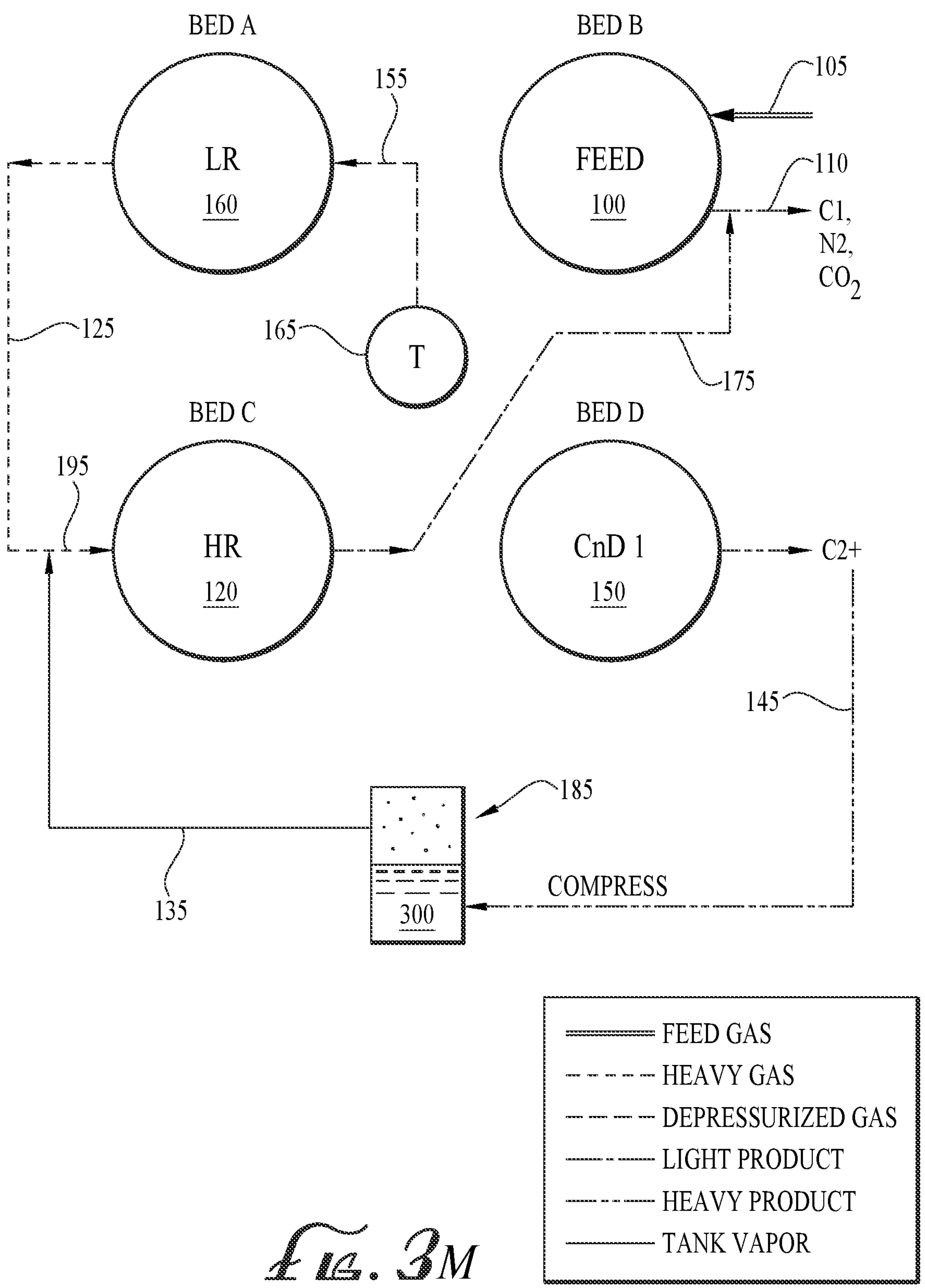
Figure 3N:
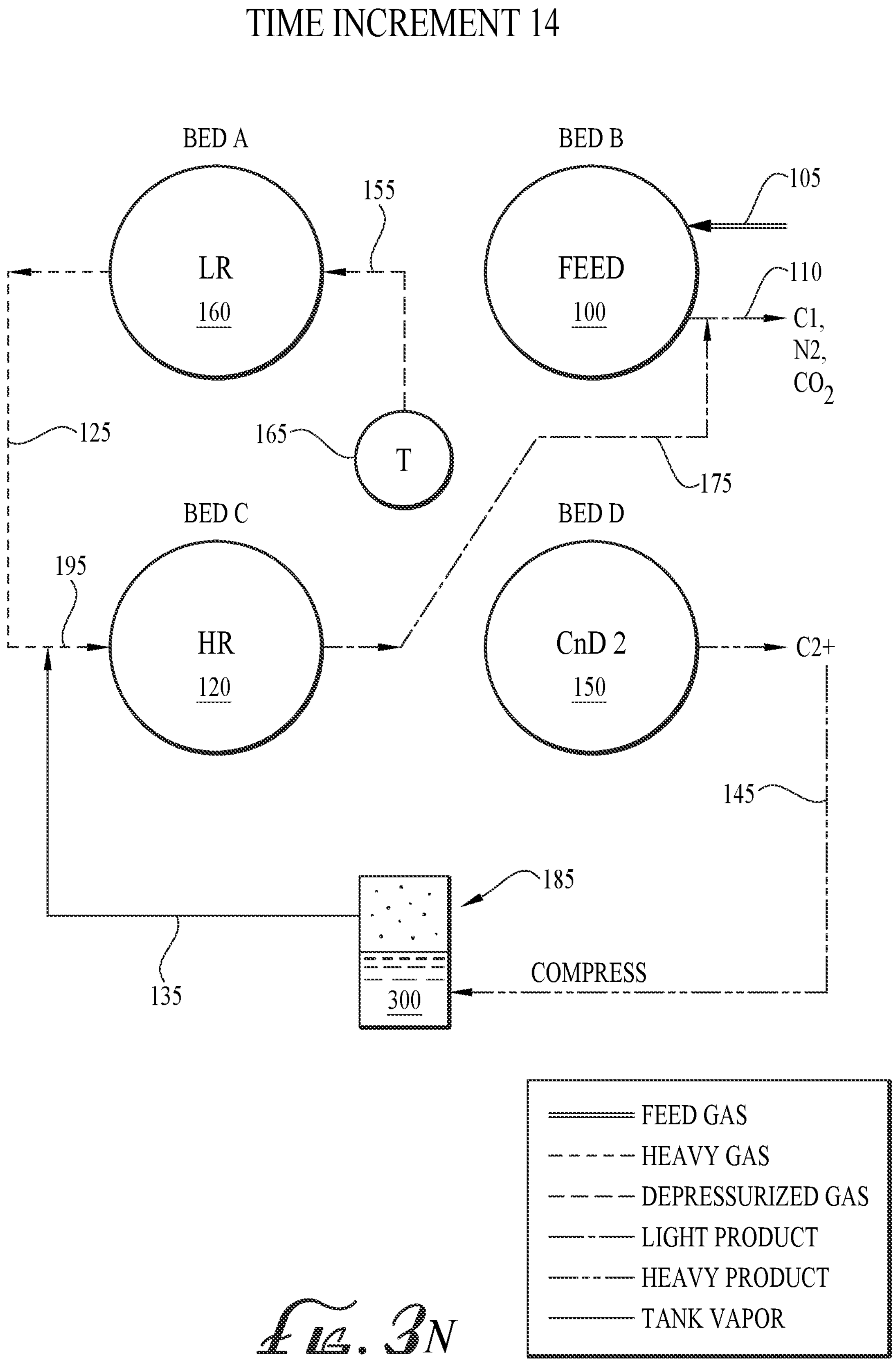
Figure 30:
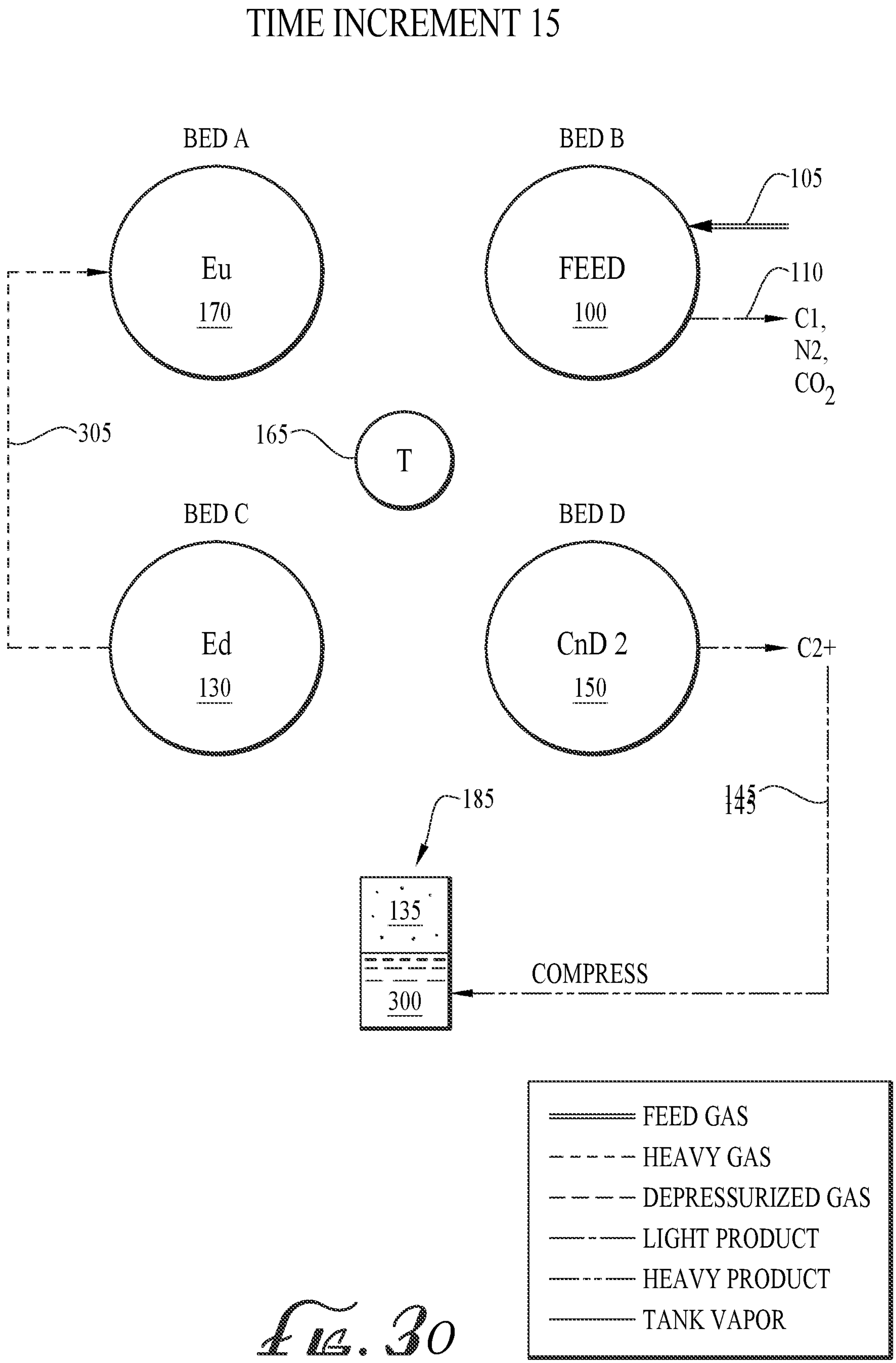
Figure 3P:
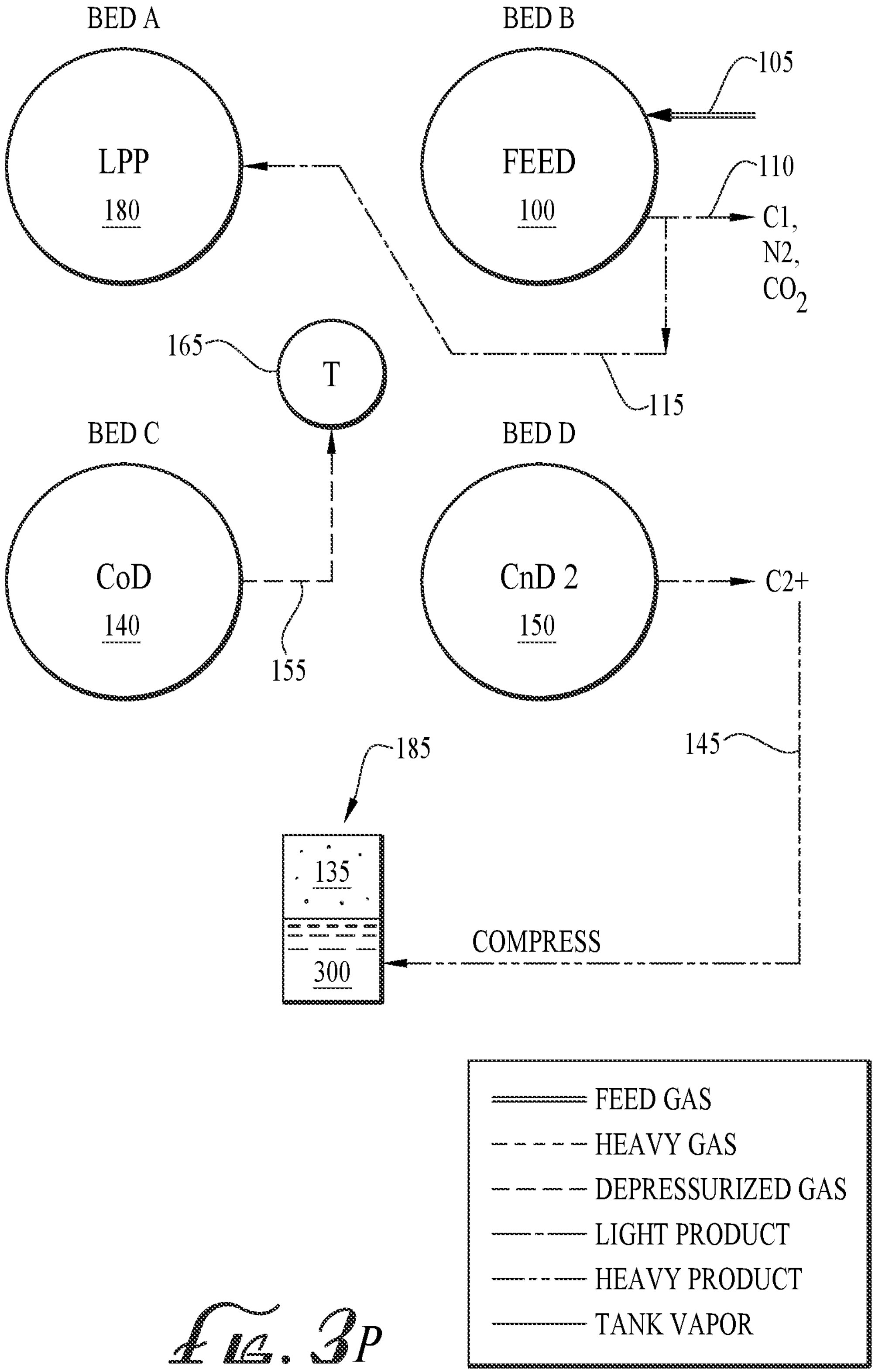

Turning now to FIGS. 3A-3P, the sixteen time-increments shown in row 260 of FIG. 2 will now be described. Although each bed undergoes eight steps in the cycle of illustrative embodiments, the steps are not all of equal length and it may be advantageous to break the cycle down into sixteen time increments to illustrate the interaction between the beds, as illustrated in FIGS. 3A-3P. Prior to Time Increment 1, the four-bed system may be primed and few runs taken to reach a periodic state. FIGS. 3A-3P assume a periodic state has been reached. Each time increment may be conducted for a period of from a few seconds to a few minutes, depending on the heavy reflux volume and gas composition. In one illustrative example, "x" in row 250 of FIG. 2 may be 220 seconds and "y" may be 120 seconds for a total cycle time of 1920 seconds. In another illustrative example, "x" may be 540 seconds and "y" may be 280 seconds for a total cycle time of 3840 seconds. The ability to change the length of the CoD and CnD steps independently of each other to extend the cycle time without impacting the equalization timesteps, allows the process to trade-off the purity and recovery of component compositions within the light or heavy products, based on the feed gas composition. Another potential of this flexibility in the process would be, for example, to increase "x", while decreasing "y" to increase a certain recovery of a component within the light product without changing the overall cycle time.

FIG. 3A illustrates Time Increment 1 of FIG. 2. At Time Increment 1, Bed A may be undergoing feed step 100, with heated, pressurized feed gas 105 entering Bed A, and light product 110 being collected from Bed A. Simultaneously, Bed B may be undergoing heavy reflux step 120. Unadsorbed methane 175 exiting Bed B during heavy reflux step 120 may be combined with light product 110. Bed C may be undergoing the first stage of countercurrent depressurization step 150, producing heavy product 145. Heavy product 145 may be compressed to form NGL product 300 and tank vapor 135. Tank vapor 135 may be removed from tank 185 and combined with buffer gas 125 exiting Bed D. This combined reflux gas 195 may flow through Bed B to remove the unadsorbed methane 175. In illustrative embodiments, reflux gas 195 may be buffer gas 125 only, a combination of buffer gas 125 and tank vapor 135, or tank vapor 135 only. Example 1 and Example 2 herein, describe the effect that changes in the volume and/or composition of reflux gas may have on the recovery and purity of the resulting light product 110 and heavy product 145.

During the first stage of CnD 150 (CnD1), one CnD pump 515 may remove heavy product from Bed C at a flowrate of 50 Mscfd in an exemplary embodiment, until the pressure inside Bed C is reduced to vacuum and/or 2-3 psia. Bed D may be undergoing light reflux step 160. Depressurized gas 155 from buffer tank 165 may be sent to Bed D for light reflux step 160, allowing buffer gas 125 to be removed and circulated to Bed B using a second pump at vacuum and/or about 3 psia. Buffer gas 125 may be compressed to 100 psia prior to being transferred to Bed B for heavy reflux step 120 at a flowrate of 50 Mscfd.

As shown in FIG. 3B, Time Increment 2 may be the same as Time Increment 1, except that Bed C may progress to the second stage of countercurrent depressurization step 150 (CnD2). As shown in FIG. 4, in one illustrative example, in the second stage of CnD step 150, flowrate through the CnD pump may be boosted to 70 Mscfd as the pressure inside Bed C may now be reduced to vacuum pressure and/or 2-6 psia.

Turning to FIG. 3C, at Time Increment 3, Bed A continues with feed step 100, and Bed C continues to the third stage of countercurrent depressurization step 150 (CnD3). By Time Increment 3, Bed D has completed its light reflux step 160. LR pump 520 may then instead be applied to CnD step 150 in Bed C to assist in moving heavy product 145, thereby doubling the flowrate. Bed B moves to equalization down step 130, and Bed D to equalization up 170. Pressurized gas 305 flows from Bed B to Bed D to reduce the pressure in Bed B and increase the pressure in Bed D.

At Time Increment 4 shown in FIG. 3D, Bed A is still undergoing feed step 100, but portion 115 of light product 110 is now diverted to Bed D, which is undergoing LPP step 180. Bed B has progressed to cocurrent depressurization step 140, with depressurized gas 155 from Bed B being stored in buffer tank 165. Bed C continues with the third stage of countercurrent depressurization step 150.

FIG. 3E illustrates Time Increment 5. Bed A has progressed to heavy reflux step 120 and Bed B now undergoes the first stage of CnD step 150 such that tank vapor 135 formed by compressed heavy product 145 collected from Bed B now flows to Bed A as combined reflux gas 195. Bed C undergoes light reflux step 160, receiving depressurized gas 155 from buffer tank 165 and providing buffer gas 125 to Bed A, again as combined heavy reflux gas 195. Bed D has begun feed step 100, with unadsorbed methane 175 from Bed A joining light product 110 from Bed D.

As shown in FIG. 3F, Time Increment 6 may be the same as Time Increment 5, except that Bed B may undergo the second stage of countercurrent depressurization step 150, the duration of which may depend on the combined heavy reflux gas 195 volume desired and gas composition of feed gas 105.

Turning to FIG. 3G, at Time Increment 7, Bed D continues with feed step 100, and Bed B undergoes the third stage of countercurrent depressurization step 150. Bed A moves to equalization down step 130, and Bed C to EU step 170. Pressurized gas 305 flows from Bed A to Bed C to reduce the pressure in Bed A and increase the pressure in Bed C. Heavy product 145 from Bed B continues to be collected and compressed in NGL storage tank 185.

At Time Increment 8 shown in FIG. 3H, Bed D is still undergoing feed step 100, but portion 115 of light product 110 is now diverted to Bed C, which is undergoing LPP step 180. Bed A has progressed to cocurrent depressurization step 140, with depressurized gas 155 from Bed A being stored in buffer tank 165. Bed B continues with the third stage of countercurrent depressurization step 150 with heavy product 145 being collected and compressed in NGL storage tank 185.

FIG. 3I illustrates Time Increment 9. Bed D has progressed to heavy reflux step 120 and Bed A now undergoes the first stage of countercurrent depressurization step 150 such that tank vapor 135 formed by compressed heavy product 145 collected from Bed A now flows to Bed D as combined reflux gas 195. Bed B undergoes light reflux step 160, receiving depressurized gas 155 from buffer tank 165 and providing buffer gas 125 to Bed D, again as combined reflux gas 195. Bed C has begun feed step 100, with unadsorbed methane 175 from Bed D joining light product 110 from Bed C.

As shown in FIG. 3J, Time Increment 10 may be the same as Time Increment 9, except that Bed A may undergo the second stage of CnD step 150 (CnD2), the duration of which may depend on the combined heavy reflux 195 volume desired and gas composition of feed gas 105.

Turning to FIG. 3K, at Time Increment 11, Bed C continues with feed step 100, and Bed A undergoes yet the third stage of countercurrent depressurization step 150. Bed D moves to ED step 130, and Bed B to EU step 170. Pressurized gas 305 flows from Bed D to Bed B to reduce the pressure in Bed D and increase the pressure in Bed B. Heavy product 145 from Bed A continues to be collected and compressed in NGL storage tank 185.

At Time Increment 12 shown in FIG. 3L, Bed C is still undergoing feed step 100, but portion 115 of light product 110 is now diverted to Bed B, which is undergoing LPP step 180. Bed D has progressed to cocurrent depressurization step 140, with depressurized gas 155 from Bed A being stored in buffer tank 165. Bed A continues with the third stage of countercurrent depressurization step 150 with heavy product 145 being collected and compressed in NGL storage tank 185.

At Time Increment 13 shown in FIG. 3M, Bed B, now regenerated, may be undergoing feed step 100, with heated, pressurized feed gas 105 entering Bed B, and light product 110 being collected from Bed B. Simultaneously, Bed C may be undergoing heavy reflux step 120.

Unadsorbed methane 175 exiting Bed C during heavy reflux step 120 may be combined with light product 110. Bed D may be undergoing the first stage of countercurrent depressurization step 150, producing heavy product 145. Heavy product 145 may be compressed to form natural gas liquid product 300 and tank vapor 135. Tank vapor 135 may be removed from tank 185 and combined with buffer gas 125 exiting Bed A. This combined reflux gas 195 may flow through Bed C to remove the unadsorbed methane 175. Bed A may be undergoing light reflux step 160. Depressurized gas 155 from buffer tank 165 may be sent to Bed A for light reflux step 160, allowing buffer gas 125 to be removed and circulated to Bed C.

As shown in FIG. 3N, Time Increment 14 may be the same as Time Increment 13, except that Bed D may undergo the second stage of countercurrent depressurization step 150, the duration of which may depend on the combined heavy reflux gas 195 volume desired and gas composition of feed gas 105.

Turning to FIG. 3O, at Time Increment 15, Bed B continues with feed step 100, and Bed D undergoes yet the third stage of countercurrent depressurization step 150. Bed C moves to equalization down step 130, and Bed A to EU step 170. Pressurized gas 305 flows from Bed C to Bed A to reduce the pressure in Bed C and increase the pressure in Bed A. Heavy product 145 from Bed D continues to be collected and compressed in NGL storage tank 185.

At Time Increment 16 shown in FIG. 3P, Bed B is still undergoing feed step 100, but portion 115 of light product 110 is now diverted to Bed A, which is undergoing LPP step 180. Bed C has progressed to cocurrent depressurization step 140, with depressurized gas 155 from Bed A being stored in buffer tank 165. Bed D continues with the third stage of countercurrent depressurization step 150 with heavy product 145 being collected and compressed into NGL storage tank 185. Time Increment 16 may complete the exemplary sixteen time increment cycle shown in FIG. 2.

Some or all increments may be repeated, extended or reduced as needed or desired. Those of skill in the art may appreciate that the number of beds and steps may be increased or decreased depending on the number of equalization steps desired. Additional equalization steps may allow for handling of feed gas 105 of more varied compositions.

As described above, the vacuum pump, for example LR pump 520, used for LR step 160 may be used to assist CnD step 150 after the semi-concurrent LR step 160 has completed. At lower pressures or in vacuum, even low concentrations of gas may equate to larger volumetric flow. Additional power may assist with the recovery of heavy product 145 under vacuum. In this manner, care should be taken to manage the flowrate of the product under different pressures. In one illustrative example, CnD step 150 may be 480 seconds and LR step 160 may be 320 seconds. In the 160 seconds of additional CnD step 150 time, LR pump 520 may be switched to produce for CnD step 150 to increase suction for enhanced heavy product 145 recovery without oversizing the vacuum pump. An exemplary graph illustrating the flowrate changes during CnD step 150 is shown in FIG. 4.

Gas Processing System

The process of FIG. 1 of illustrative embodiments may be operated using the exemplary system of FIG. 5. As shown in FIG. 5, Bed A, Bed B, Bed C and Bed D may be fluidly coupled together using piping and valve system 500 to control fluid flow. Heat exchanger 505 and/or a heater may raise the temperature of feed gas 105 entering a bed undergoing feed step 100. Heavy reflux compressor 525 and heavy product compressor 510 may compress feed gas 105 and/or reflux gas 195 to increase pressure of fluid prior to entering a bed undergoing feed step 100 and/or heavy reflux step 120. In some embodiments, a heavy product compressor 510 may be applied to feed gas 105 and/or heavy reflux compressor 525 may be applied to buffer gas 125 and/or reflux gas 195. CnD pump 515, which may be a vacuum pump, may bring a bed to vacuum and collect heavy product 145 from a bed undergoing CnD step 150. LR pump 520 may circulate buffer gas 125 and/or reflux gas 195 as further described herein. LR pump 520 may also be applied to CnD step 150 once light reflux step 160 has been completed as more specifically illustrated in FIG. 4. CnD pump 515 and/or LR pump 520 may decrease pressure of tanks to desorb and recover heavy product 145 under vacuum.

One or more fluid moving pumps for CnD pump 515 and/or LR pump 520 or compression devices may be employed, for example, a centrifugal pump, positive displacement pump, piston, rotary piston, or lobes (fixed volume displacements). For overcoming net differential pressure in a fluid stream, a centrifugal pump may be beneficial since the impeller will impart energy to result in a discharge pressure. A variable speed centrifugal pump may be operated for high inlet pressures at low speeds to generate head (pressure). For operating at low pressures, higher speeds may be employed to compensate for the need to generate more head. In another example, a positive displacement pump may move a physical inlet volume nearly independent of the inlet and outlet pressures. The heater (for example, heat exchanger 505) may be a low-pressure plate type heat exchanger or shell and tube heat exchanger. A shell and tube heat exchanger may be employed where higher pressures are maintained. Other heaters well known to those of skill in the art may be employed. A heater may also be utilized to heat the reflux gas 195 prior to its introduction into an adsorbent bed during heavy reflux step 120.

Figure 6:
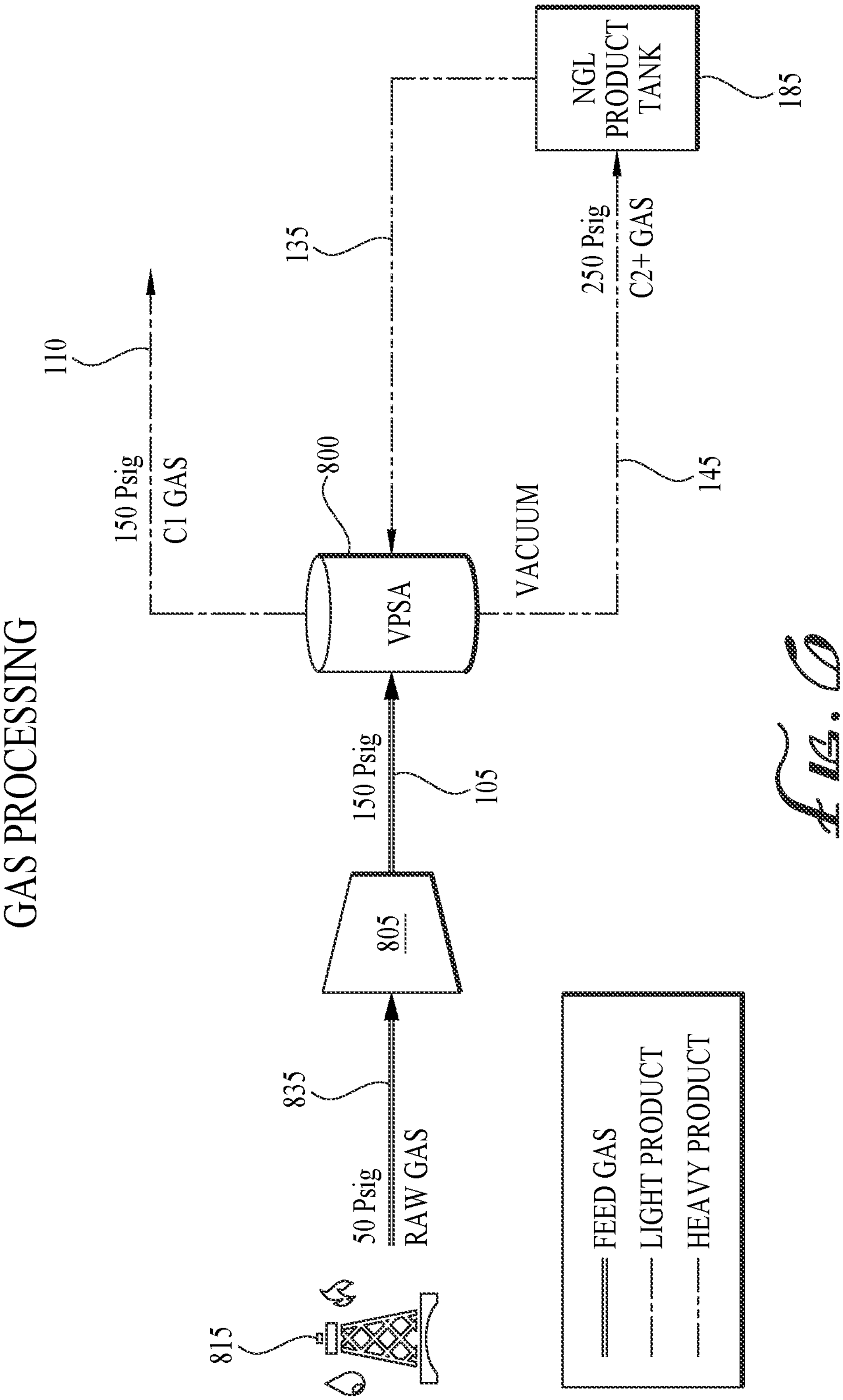
FIG. 6 is a schematic diagram of a gas processing system of illustrative embodiments.

FIG. 6 illustrates a vacuum pressure swing adsorption (VPSA) system of illustrative embodiments. Rich gas 835 may be taken from wellhead 815 and/or an oil and gas producing area. Wellhead 815 may be coupled to a well, such as a hole in the earth from which oil, natural gas, and/or NGLs are produced. A well, for example, may be an oil well with associated gas, or a gas well rich in NGLs (non-methane hydrocarbons). Rich gas 835 may be compressed in gas processing inlet compressor 805 to produce feed gas 105 at about 150 psia. Alternatively, rich gas 835 may enter VPSA system 800 at 100 psia, or at 50-215 psia. VPSA system 800 may process gas to produce both a high purity and high recovery light product 110, and also may produce a high purity heavy product 145. Heavy product compressor 510 may compress heavy product 145 for storage in NGL product storage tank 185. NGL storage tank vapor may be returned to VPSA system 800 as further described herein. VPSA system 800 may include Bed A, Bed B, Bed C, Bed D, valve system 500, CnD pump 515, LR pump 520, heavy product compressor 510, heavy reflux compressor 525 and/or heat exchanger 505 and may be contained on a skid or other similar portable unit, which may be less than eight feet wide and meet U.S. Department of Transportation requirements for road transport.

VPSA Examples

The following examples demonstrate that the VPSA cycle of illustrative embodiments may be adaptable and robust for wellsite and field use over a range of gas compositions. Unlike conventional methods, illustrative embodiments may address the variability of feed gas compositions that would typically be encountered in different geographical and geological formations. The following examples employ the exemplary feed gas compositions set forth in Table 1.

TABLE 1

Exemplary Feed Gas Compositions

| Composition, mol % | Low BTU | Medium BTU | High BTU |
|---|---|---|---|
| $CO_2$ | 0.50 | 2.22 | 0.80 |
| C1 | 82.10 | 62.41 | 43.60 |
| C2 | 10.90 | 16.87 | 28.80 |
| C3 | 4.30 | 13.48 | 18.50 |
| C4 | 1.50 | 3.71 | 6.60 |
| C5 | 0.50 | 0.89 | 1.40 |
| C6 | 0.20 | 0.34 | 0.30 |
| Total | 100 | 100 | 100 |
| Gross Heating Value (BTU/scf) | 1,200 | 1,440 | 1,700 |

Example 1 considers application of the VPSA cycle of illustrative embodiments handling the "Medium BTU" raw natural gas stream as feed gas 105, with initial feed pressure of 100 psia. The separation and recovery may follow the cycle and schedule of illustrative embodiments herein, and the results are illustrated in Table 2. Table 2 shows the production of a methane product (light product 110) that meets pipeline specifications with greater than 96% methane recovery while also achieving a high C3+ recovery in heavy product 145. The results shown in Table 2 make use of only buffer gas 125, and do not employ tank vapor 135 for heavy reflux step 120.

TABLE 2

Light and Heavy Product Streams for Example 1.

| | Light Product | | Heavy Product | |
|---|---|---|---|---|
| Composition | Recovery % | Mol % | Recovery % | Mol % |
| $CO_2$ | 89.7 | 2.8 | 10.3 | 0.5 |
| C1 | 96.6 | 84.0 | 3.4 | 0.7 |
| C2 | 49.0 | 11.5 | 51.0 | 32.2 |
| C3 | 9.1 | 1.7 | 90.9 | 46.8 |
| C4 | 0.0 | 0.0 | 100.0 | 14.8 |
| C5 | 0.0 | 0.0 | 100.0 | 3.6 |
| C6 | 0.0 | 0.0 | 100.0 | 1.4 |
| Total | | 100 | | 100 |
| Gross Heating Value (BTU/scf) | | 1,100 | | |

An even higher percentage methane recovery and purity than that shown in Table 2 may be achieved by introducing additional feed into heavy reflux step 120, in the form of tank vapor 135. This may be achieved by feeding some of the tank vapor 135 of the NGL product 300 and combining this vapor NGL product with buffer gas 125 for heavy reflux step 120. This greater volume of combined reflux gas 195 helps further displace the light component (light product 110) from the adsorbed phase near the feed end of the bed (for example Bed A, Bed B, Bed C and Bed D) and flushes it downstream toward the light product end of the bed, effectively filling both the adsorbed and gas phases in much of the bed with heavy product 145, while continuing to produce light product 110 with greater methane purity. This larger volume of heavy reflux gas 195 is recovered during the subsequent CnD step 150 and countercurrent purge step with light product reflux (LR step 160), again resulting in heavy product 145 that is more enriched in the heavy component.

In Example 2, using the "Medium BTU" raw gas as feed gas 105 into the same four-bed and eight-step process of illustrative embodiments and/or the VPSA process of illustrative embodiments, with an additional 10% of flow, relative to the feed gas 105 flow rate, added to heavy reflux step 120 from the NGL product tank vapor 135 at a pressure of 100 psia. In this example, the feed gas 105 flow rate may be about 4,000 liters per minute (LPM), so the flow rate of tank vapor may be about 400 LPM. As compared to Example 1, there is no change in the number of steps of the cycle, nor is there a sequence change of the steps in the cycle. Only an increase in the flow of heavy reflux gas 195 is introduced to the system. This small, yet significant addition may enable the methane in the raw gas to be completely recovered in light product 110 and may provide greater than 95% recovery of all C3+ products as NGL 300 for sale, as shown in Table 3.

TABLE 3

Light and Heavy Product Streams for Example 2.

| | Light Product | | Heavy Product | |
|---|---|---|---|---|
| Composition | Recovery % | Mol % | Recovery % | Mol % |
| $CO_2$ | 94.5 | 3.0 | 5.3 | 0.5 |
| C1 | 99.4 | 88.1 | 0.6 | 0.7 |
| C2 | 29.0 | 8.3 | 71.0 | 32.2 |
| C3 | 2.6 | 0.6 | 97.4 | 46.8 |
| C4 | 0.0 | 0.0 | 100.0 | 14.8 |
| C5 | 0.0 | 0.0 | 100.0 | 3.6 |
| C6 | 0.0 | 0.0 | 100.0 | 1.4 |
| Total | | 100 | | 100 |
| Gross Heating Value (BTU/scf) | | 1,055 | | |

Example 3 may address a situation where the raw feed gas 105 is richer, such as in the "Higher BTU" case in Table 1. Using the same four-bed, eight-step adsorption process and same feed flowrate and pressure, methane may be completely recovered in light product 110 as the preference of the adsorption process to favor heavier hydrocarbons has helped push all the methane out as light product 110. The working capacity of the adsorption beds has been saturated by the heavier hydrocarbons, as shown in Table 4. Very high recovery of methane product also means that this adsorption process also ably recovers the heavy product 145 well, even with a high BTU feed gas 105.

TABLE 4

Light and Heavy Product Streams for Example 3.

| | Light Product | | Heavy Product | |
|---|---|---|---|---|
| Composition | Recovery % | Mol % | Recovery % | Mol % |
| $CO_2$ | 97.3 | 1.3 | 2.7 | 0.0 |
| C1 | 99.9 | 71.0 | 0.1 | 0.0 |
| C2 | 44.0 | 23.0 | 56.0 | 39.9 |
| C3 | 13.7 | 4.6 | 86.3 | 40.7 |

TABLE 4-continued

Light and Heavy Product Streams for Example 3.

| Composition | Light Product Recovery % | Light Product Mol % | Heavy Product Recovery % | Heavy Product Mol % |
|---|---|---|---|---|
| C4 | 0.5 | 0.1 | 99.5 | 15.5 |
| C5 | 0.1 | 0.0 | 99.9 | 3.2 |
| C6 | 0.1 | 0.0 | 99.9 | 0.7 |
| Total | | 100 | | 100 |
| Gross Heating Value (BTU/scf) | | 1,243 | | |

While high recovery of methane is achieved even with very rich raw gas streams, the light product of Table 4 would unfortunately not meet pipeline specifications and may potentially still contain too much ethane and propane to be in an issue in subsequent downstream applications, such as feedstock to a Fischer-Tropsch process or hydrogen production or compressed natural gas for transport (CNG) or even as fuel for compression or power generation.

If more stringent light product requirements are required, then the VPSA process of illustrative embodiments may be turned down to produce light product 110 that is once more within product specifications for a wide range of downstream applications. Table 5 shows light product 110 specifications that may be achieved simply by reducing the throughput of the system by 30% (i.e., reducing the flowrate of feed gas 105 from 4,000 LPM to 2,800 LPM), if a raw gas stream similar to the "High BTU" case is observed and leaner or lower Btu light product 110 is desired. The amount of turndown can be optimized to the requirements of light product 110 application. Greater than 95% recovery of C3+ hydrocarbons is achieved with or without turndown. No additional adsorption beds or additional steps to the cycle may be required.

TABLE 5

Light and Heavy Product Streams for Example 3.

| Composition | Light Product Recovery % | Light Product Mol % | Heavy Product Recovery % | Heavy Product Mol % |
|---|---|---|---|---|
| CO2 | 96.8 | 1.4 | 3.2 | 0.0 |
| C1 | 99.6 | 79.6 | 0.4 | 0.4 |
| C2 | 28.8 | 17.9 | 71.2 | 43.4 |
| C3 | 2.6 | 1.1 | 97.4 | 39.8 |
| C4 | 0.1 | 0.0 | 99.9 | 13.1 |
| C5 | 0.0 | 0.0 | 100.0 | 2.7 |
| C6 | 0.0 | 0.0 | 100.0 | 0.6 |
| Total | | 100 | | 100 |
| Gross Heating Value (BTU/scf) | | 1,150 | | |

At the other end of the spectrum, when the four-bed, eight-step process of illustrative embodiments is employed to process gas that has less heavier hydrocarbons in its compositions, such as in the "Low BTU" case of Table 1, the high purity light product 110 is easily achieved, as shown in Table 6. However, there is significant methane slip into heavy product 145 and in this instance means an NGL product 300 is not achievable even though there is almost complete recovery of the heavier hydrocarbon components in heavy product 145, because there is too much methane in the heavy product 145 of Table 6.

TABLE 6

Light and Heavy Product Streams for Example 4.

| Composition | Light Product Recovery % | Light Product Mol % | Heavy Product Recovery % | Heavy Product Mol % |
|---|---|---|---|---|
| CO2 | 73.5 | 0.5 | 26.5 | 0.4 |
| C1 | 91.2 | 98.6 | 8.8 | 23.5 |
| C2 | 4.7 | 0.9 | 95.3 | 44.2 |
| C3 | 0.0 | 0.0 | 100.0 | 23.1 |
| C4 | 0.0 | 0.0 | 100.0 | 6.3 |
| C5 | 0.0 | 0.0 | 100.0 | 1.8 |
| C6 | 0.0 | 0.0 | 100.0 | 0.7 |
| Total | | 100 | | 100 |
| Gross Heating Value (BTU/scf) | | 1,010 | | |

While one could increase the throughput as opposed to decreasing throughput as discussed in Example 3, increasing the throughput would produce a better quality NGL product 300, but the increased flowrate through the system would also decrease the recovery of the heavier hydrocarbons, instead moving some of these heavier hydrocarbon components into light product 110. Table 7 shows the product outcomes of doubling the throughput of the system to minimize the methane slip into the heavy product.

TABLE 7

Light and Heavy Product Streams for Example 4.

| Composition | Light Product Recovery % | Light Product Mol % | Heavy Product Recovery % | Heavy Product Mol % |
|---|---|---|---|---|
| CO2 | 87.7 | 0.5 | 12.3 | 0.4 |
| C1 | 98.3 | 92.7 | 1.7 | 8.9 |
| C2 | 39.6 | 5.7 | 60.4 | 46.5 |
| C3 | 14.9 | 1.0 | 85.1 | 29.6 |
| C4 | 3.4 | 0.1 | 96.6 | 10.2 |
| C5 | 0.3 | 0.0 | 99.7 | 3.2 |
| C6 | 0.3 | 0.0 | 99.7 | 1.2 |
| Total | | 100 | | 100 |
| Gross Heating Value (BTU/scf) | | 1,065 | | |

There is flexibility in the VPSA process of illustrative embodiments to ensure that methane slip is minimized. This may be achieved by increasing the cycle time so feed step 100 and the coupled CoD step 140 and LPP step 180 may be lengthened. In the current example, the length of time for feed step 100 is doubled. Optimizing the distribution of this increased time between cocurrent depressurization step 140 and light product pressurization step 180 allows for high NGL product 300 recovery and high light product 110 purity with respect to methane. In illustrative embodiments, the time for CoD step 140 and LPP step 180 when feed step 100 time is doubled, may be optimized as shown in Table 0.

TABLE 8

Light and Heavy product streams for Example 4.

| Composition | Light Product Recovery % | Light Product Mol % | Heavy Product Recovery % | Heavy Product Mol % |
|---|---|---|---|---|
| CO2 | 96.2 | 0.6 | 3.8 | 0.1 |
| C1 | 99.8 | 93.9 | 0.2 | 0.7 |
| C2 | 44.1 | 5.5 | 55.9 | 49.0 |
| C3 | 0.7 | 0.0 | 99.3 | 37.9 |
| C4 | 0.0 | 0.0 | 100.0 | 9.2 |

TABLE 8-continued

Light and Heavy product streams for Example 4.

| | Light Product | | Heavy Product | |
|---|---|---|---|---|
| Composition | Recovery % | Mol % | Recovery % | Mol % |
| C5 | 0.0 | 0.0 | 100.0 | 2.3 |
| C6 | 0.0 | 0.0 | 100.0 | 0.8 |
| Total | | 100 | | 100 |
| Gross Heating Value (BTU/scf) | | 1,075 | | |

Thus, the illustrative examples of Tables 1-8 demonstrate the way in which the adsorption process of illustrative embodiments may successfully obtain high purity and high recovery of both light product 110 and heavy product 145 with a wide composition range of feed gas 105 inputs. This ability represents a significant improvement to conventional processes, by allowing a single, small footprint and easily transportable system to successfully process a wide variety of associated gas at a wellsite to produce light and/or heavy products that may be monetizable, rather than flared despite originating from stranded gas, remote wells and/or wells with smaller productivity volumes. The VPSA system 800 of illustrative embodiments may be continuously regenerated and reused without the need for the adsorbent of illustrative embodiments to be replaced.

A portable pressure swing adsorption method and system for low flow rate gas processing has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A method of processing hydrocarbon gas comprising:
- feeding heated and pressurized hydrocarbon gas at a feed flowrate for a feed time through a first adsorption bed of a pressure swing adsorption (PSA) system;
- recovering a light product from the first adsorption bed during the feed time;
- obtaining a heavy product from a second adsorption bed of the PSA system during the feed time;
- compressing the heavy product to obtain natural gas liquid (NGL) and NGL storage tank vapor from the heavy product;
- sending a volume of reflux gas through the first adsorption bed after the feed time to obtain additional light product; and
- adjusting one of the feed flowrate, the feed time, the volume of reflux gas, or a combination thereof based on a gross heating value of the heated and pressurized hydrocarbon gas, wherein adjusting the volume of reflux gas comprises combining the NGL storage tank vapor with the volume of reflux gas.

2. The method of claim 1, wherein the adjusting one of the feed flowrate, the feed time, the volume of the reflux gas, or the combination thereof adjusts a purity and a recovery percentage of both the light product and the heavy product.

3. The method of claim 1, wherein a gross heating value of the light product recovered from the heated and pressurized hydrocarbon gas is less than or equal to 1,100 Btu/scf.

4. The method of claim 1, wherein the pressure swing adsorption system comprises four adsorbent beds.

5. The method of claim 4, wherein each adsorbent bed of the four adsorbent beds cycles through eight steps asynchronous to one another.

6. The method of claim 5, wherein the eight steps, in order, consist of feed, heavy reflux, equalization down, cocurrent depressurization, countercurrent depressurization, light reflux, equalization up and light product pressurization.

7. The method of claim 6, wherein the countercurrent depressurization step comprises three stages at varying flowrates.

8. The method of claim 1, wherein the PSA system comprises a buffer tank, the buffer tank collecting depressurized gas from a third adsorbent bed undergoing depressurization during at least a portion of the feed time, and delivering the depressurized gas to the first adsorption bed after the feed time, wherein the reflux gas comprises the depressurized gas.

9. The method of claim 1, wherein the PSA system is a vacuum pressure swing adsorption system and the second adsorption bed depressurizes to about vacuum during the feed time.

* * * * *